US012288941B2

(12) United States Patent
Lei et al.

(10) Patent No.: US 12,288,941 B2
(45) Date of Patent: Apr. 29, 2025

(54) BOARD-TO-BOARD CONNECTOR TERMINAL AND CONNECTOR

(71) Applicant: FCI NANTONG LTD., Nantong (CN)

(72) Inventors: Liqing Lei, Nantong (CN); Zelin Yao, Nantong (CN)

(73) Assignee: FCI NANTONG LTD., Nantong (CN)

( * ) Notice: Subject to any disclaimer, the term of this patent is extended or adjusted under 35 U.S.C. 154(b) by 461 days.

(21) Appl. No.: 17/769,687

(22) PCT Filed: Oct. 26, 2020

(86) PCT No.: PCT/CN2020/123527
§ 371 (c)(1),
(2) Date: Apr. 15, 2022

(87) PCT Pub. No.: WO2021/248771
PCT Pub. Date: Dec. 16, 2021

(65) Prior Publication Data
US 2022/0393377 A1 Dec. 8, 2022

(30) Foreign Application Priority Data
Jun. 8, 2020 (CN) ......................... 202010512093.1
Jul. 27, 2020 (CN) ......................... 202010729708.6

(51) Int. Cl.
*H01R 12/71* (2011.01)
*H01R 12/55* (2011.01)
(Continued)

(52) U.S. Cl.
CPC ........... *H01R 12/716* (2013.01); *H01R 12/55* (2013.01); *H01R 13/04* (2013.01); *H01R 13/20* (2013.01);
(Continued)

(58) Field of Classification Search
CPC .... H01R 12/716; H01R 12/55; H01R 13/639; H01R 13/20; H01R 13/04; H01R 13/502
(Continued)

(56) References Cited

U.S. PATENT DOCUMENTS 7,320,606 B2 * 1/2008 Midorikawa .......... H01R 13/20 439/74
10,056,714 B2 8/2018 Sato
(Continued)

FOREIGN PATENT DOCUMENTS

CN 2562391 Y 7/2003 ........... H01R 13/648
CN 201160144 Y 12/2008 ............. H01R 13/11
(Continued)

OTHER PUBLICATIONS

International Search Report and Written Opinion for Application No. PCT/CN2020/123527, mailed Mar. 10, 2021.
(Continued)

*Primary Examiner* — Peter G Leigh
(74) *Attorney, Agent, or Firm* — MARSHALL, GERSTEIN & BORUN LLP

(57) ABSTRACT

The present disclosure proposes a board-to-board connector terminal and a connector. The board-to-board connector terminal comprises: a male connector terminal including a first part; and a female connector terminal including a second part, wherein in the case of the male connector terminal and the female connector terminal adaptively installed, the male connector terminal is in contact with the female connector terminal; when the male connector terminal is detached from the female connector terminal, the second part abuts against the first part to prevent the male connector terminal being detached from the female connector terminal; in the case of the male connector terminal forcibly detached from the female connector terminal, the
(Continued)

first part pushes the second part to cause the second part to be peeled off, such that the female connector terminal is damaged and does not work properly. With the above-mentioned technical solution, the first part cooperates with the second part to enable the female connector to be damaged after the male connector is detached from the female connector, thereby preventing multiple times of plugging of the connector.

9 Claims, 17 Drawing Sheets

(51) Int. Cl.
*H01R 13/04* (2006.01)
*H01R 13/20* (2006.01)
*H01R 13/502* (2006.01)
*H01R 13/639* (2006.01)

(52) U.S. Cl.
CPC ......... *H01R 13/502* (2013.01); *H01R 13/639* (2013.01)

(58) Field of Classification Search
USPC ............................................................ 439/65
See application file for complete search history.

(56) References Cited

U.S. PATENT DOCUMENTS

| | | | | |
|---|---|---|---|---|
| 2007/0141867 | A1* | 6/2007 | Kishi | H01R 12/716 439/74 |
| 2008/0038939 | A1* | 2/2008 | Wu | H01R 12/52 439/55 |
| 2009/0264001 | A1* | 10/2009 | Yi | H01R 24/84 439/248 |
| 2013/0137307 | A1* | 5/2013 | Huang | H01R 24/60 439/660 |
| 2013/0137308 | A1* | 5/2013 | Chiang | H01R 12/716 439/660 |
| 2013/0295784 | A1* | 11/2013 | Hasegawa | H01R 12/73 439/55 |
| 2013/0330943 | A1* | 12/2013 | Sasaki | H01R 12/716 439/74 |
| 2013/0344710 | A1* | 12/2013 | Sasaki | H01R 12/716 439/65 |
| 2016/0036145 | A1* | 2/2016 | Hasegawa | H01R 12/73 439/78 |
| 2016/0064843 | A1* | 3/2016 | Hasegawa | H01R 12/716 439/65 |
| 2018/0159270 | A1* | 6/2018 | Sato | H01R 12/712 |
| 2020/0127400 | A1* | 4/2020 | Sasayama | H01R 4/02 |

FOREIGN PATENT DOCUMENTS

| | | | | | |
|---|---|---|---|---|---|
| CN | 101599601 | A | | 12/2009 | |
| CN | 202183481 | U | * | 4/2012 | |
| CN | 102790307 | A | * | 11/2012 | |
| CN | 202737154 | U | * | 2/2013 | |
| CN | 205752700 | U | * | 11/2016 | |
| CN | 108598753 | A | | 9/2018 | |
| CN | 208157676 | U | * | 11/2018 | |
| CN | 109256631 | A | | 1/2019 | H01R 12/75 |
| CN | 210182658 | U | | 3/2020 | |
| CN | 111600148 | A | | 8/2020 | |
| CN | 111834768 | A | | 10/2020 | H01R 13/629 |
| CN | 212085270 | U | | 12/2020 | H01R 13/40 |
| JP | 2015222620 | A | | 12/2015 | H01R 13/115 |
| KR | 20170042484 | A | * | 4/2017 | H01R 12/52 |
| WO | WO-2020011293 | A1 | | 1/2020 | |

OTHER PUBLICATIONS

First Office Action, Chinese Patent Application No. 202010512093.1, dated Sep. 30, 2024, 10 pages.
First Search Report, Chinese Patent Application No. 202010512093.1, dated Sep. 30, 2024, 2 pages.

* cited by examiner

BOARD-TO-BOARD CONNECTOR TERMINAL AND CONNECTOR

TECHNICAL FIELD

The present disclosure related to the field of connectors, in particular to a board-to-board connector terminal and a connector.

BACKGROUND

Connectors are required for data and power transmission from small-scale instruments to large-scale equipment. Connectors are increasingly used. Today's equipment and instruments are becoming miniaturized, and the connectors inside the equipment need to be miniaturized accordingly. Conventional small-spacing connectors are allowed for multiple times of plugging, but when they are used for protective circuit devices, it is necessary to avoid multiple times of plugging to prevent others from intercepting information.

SUMMARY

The present disclosure intends to propose a board-to-board connector terminal and a board-to-board connector, which disenables multiple times of plugging to avoid information interception.

The present disclosure proposes a board-to-board connector terminal comprising:

a male connector terminal including a first part; and a female connector terminal including a second part, wherein the male connector terminal is in contact with the female connector terminal in a state where the male connector terminal and the female connector terminal are adaptively installed, wherein when the male connector terminal is detached from the female connector terminal, the second part abuts against the first part, so as to prevent the male connector terminal from being detached from the female connector terminal, and in the case of the male connector terminal forcibly detached from the female connector terminal, the first part pushes the second part to cause the second part to be peeled off, such that the female connector terminal is damaged and does not work properly.

Preferably, the first part includes a male connector slot section and a male connector head section, the male connector head section is located at a front end of the male connector terminal, the male connector slot section is located at a rear portion of the male connector head section, a width of the male connector head section is greater than a width of the male connector slot section, and a connecting portion between the male connector slot section and the male connector head section forms a stepped portion; and the second part includes an engaging portion that encloses an engagement space including a restricting section, in the direction of inserting the male connector terminal into the engaging portion, side surfaces of two engaging arms that define the restricting section are tapered in an inverted "splay" shape, in the case of the male connector terminal and the female connector terminal adaptively installed, the male connector head section is located outside of the engagement space, and the width of the male connector head section is greater than a width of the restricting section when the engaging arm is in a natural state, and when the male connector terminal is detached from the female connector terminal, the stepped portion is capable of pushing the engaging arms, causing the engaging arms to be peeled off, and the female connector terminal to be damaged.

Preferably, the engagement space further includes a guiding section, in the direction of inserting the male connector terminal into the engaging portion, the guiding section is located at an upstream of the restricting section, and the side surfaces of the two engaging arms that define the guiding section are tapered in an inverted "splay" shape, such that the engaging arms are capable of guiding the male connector terminal into the engagement space.

Preferably, the engagement space further includes a holding section, in the direction of inserting the male connector terminal into the engaging portion, the holding section is located at the upstream of the restricting section, and is located at the downstream of the guiding section, in the direction of inserting the male connector terminal into the engaging portion, the side surfaces of the two engaging arms that define the holding section are diverged in a "splay" shape, and are convex arc surfaces, and in the case of the male connector terminal and the female connector terminal adaptively installed, the two engaging arms that define the holding section hold the male connector terminal, such that the male connector terminal and the engaging arms are in arc surface contact.

Preferably, the engagement space further includes a clamping section, in the direction of inserting the male connector terminal into the engaging portion, the clamping section is located at the downstream of the restricting section, and in the case of the male connector terminal and the female connector terminal adaptively installed, the two engaging arms that define the clamping section clamp the male connector slot section.

Preferably, the male connector terminal further includes a male connector contact section having a width greater than the width of the restricting section when the engaging arms are in the natural state, and in the case of the male connector terminal and the female connector terminal adaptively installed, the parts of the two engaging arms that define the restricting section are pushed apart and clamp the male connector contact section.

Preferably, connecting portion between the male connector contact section and the male connector slot section forms a guiding slope, and when the male connector terminal is inserted into the engaging portion, the guiding slope is capable of fitting the side surfaces of the two engaging arms that define the restricting section, so that the two engaging arms are pushed apart.

Preferably, the stepped portion is formed into a concave arc surface, and the concave arc surface abuts against the engaging arms when the male connector terminal is detached from the female connector terminal.

The present disclosure further proposes a board-to-board connector comprising:

a male connector including the male connector terminal as described above; and a female connector including the female connector terminal as described above.

Preferably, the male connector further includes a male connector metal fixing sheet having a male connector slot, the female connector further includes a female connector metal fixing sheet comprising a female connector fixing body and a female connector elastic piece that is resiliently connected to the female connector fixing body, in the case of the male connector terminal and the female connector terminal adaptively installed, the female connector elastic piece is embedded into the male connector slot, and when the male connector is detached from the female connector, the female connector elastic piece abuts against an edge of the male connector slot.

Preferably, the male connector metal fixing sheet has a male connector elastic piece, and in the case of the male connector and the female connector adaptively installed, the female connector applies pressure to the male connector elastic piece to deform the male connector elastic piece, such that the male connector and the female connector press each other to increase connection stability.

With the above-mentioned technical solutions, the first part cooperates with the second part to enable the female connector to be damaged after the male connector is detached from the female connector, thereby preventing multiple times of plugging of the connector.

DETAILED DESCRIPTION

Figure 1:
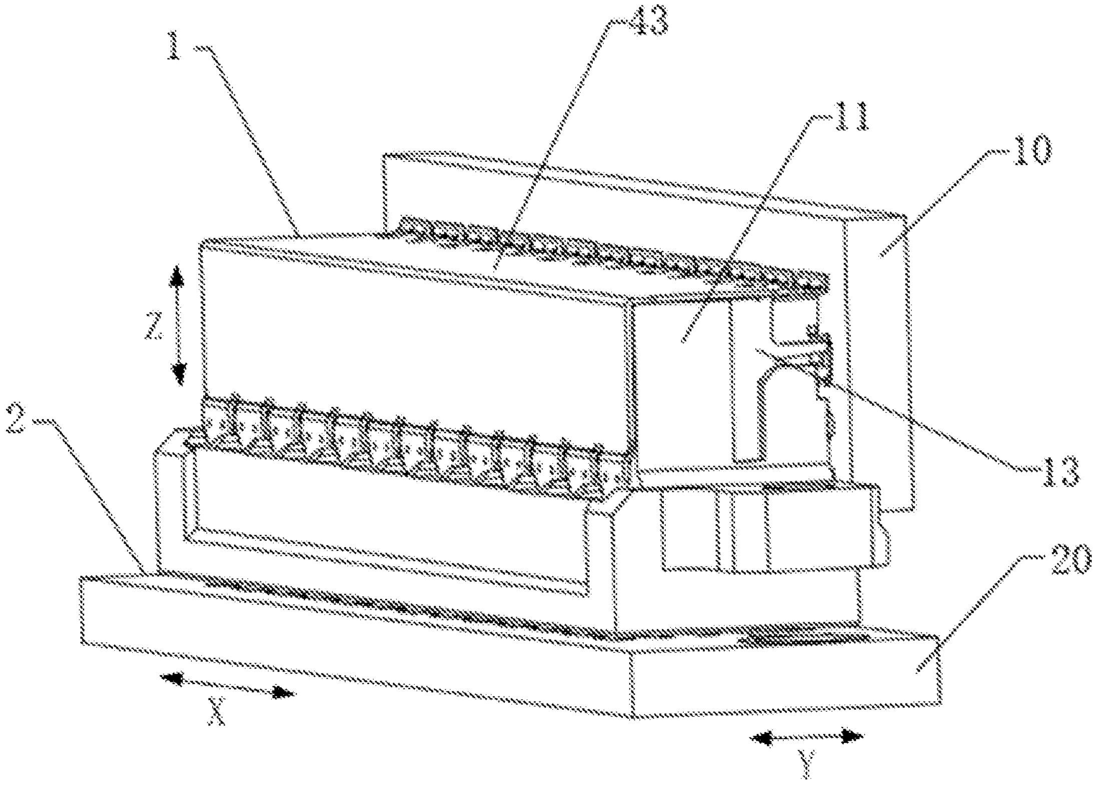
FIG. 1 shows a schematic structural diagram of the board-to-board connector according to the first embodiment of the present disclosure.
Figure 2:
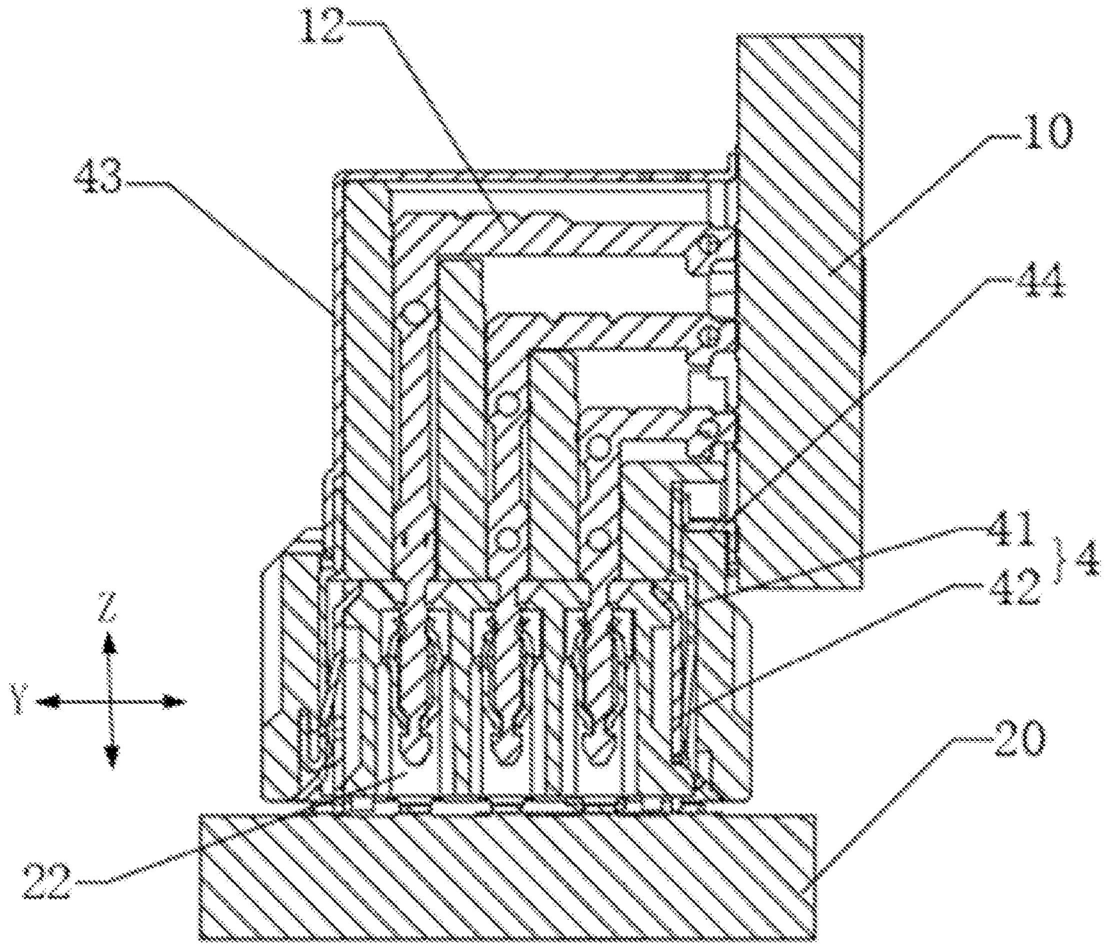
FIG. 2 shows a cross-sectional view of the board-to-board connector according to the first embodiment of the present disclosure.
Figure 3:
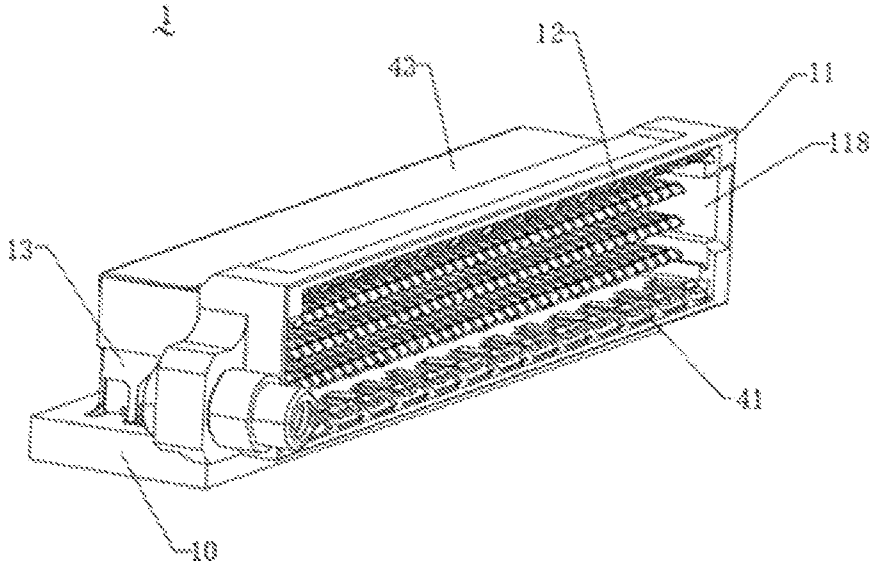
FIG. 3 shows a schematic structural diagram of the male connector of the board-to-board connector according to the first embodiment of the present disclosure.

To illustrate the above-mentioned objectives, features and advantages of the present disclosure, specific embodiments of the present disclosure will be described in detail in this part with reference to the drawings. In addition to the embodiments described herein, the present disclosure can also be implemented in other different ways. A person skilled in the art is motivated to make corresponding improvements, variations, and substitutions without departing from the spirit of the present disclosure. Therefore, the present disclosure is not subject to the specific embodiments disclosed herein. The scope of protection for the present disclosure shall be subject to the claims.

First Embodiment

As shown in FIGS. 1-19, the present disclosure proposes a board-to-board connector, comprising a male connector 1 and a female connector 2 that can be connected to each other. The board-to-board connector can be applied in protective circuit devices. The connector is able to operate properly once the male connector 1 and female connector 2 are connected for the first time. The male connector 1 cannot be easily detached from the female connector 2 with the attempt. After the male connector 1 is forcibly detached from the female connector 2, the connector is damaged and cannot be used again, thereby avoiding information interception.

(Male Connector)

As shown in FIGS. 1-12, the male connector 1 includes a male connector plastic body 11, a male connector PCB (printed circuit board) 10, a male connector terminal 12, a metal sheet at the male connector side 13, a male connector metal fixing sheet 41, a male connector metal housing 43, and a male connector welding metal strip 44.

The male connector terminal 12 is mounted in the male connector plastic body 11. The male connector terminal 12, the male connector metal fixing sheet 41, and the male connector welding metal strip 44 are connected to the male connector PCB 10. For example, the male connector terminal 12, the male connector metal fixing sheet 41, and the male connector welding metal strip 44 are welded on the male connector PCB 10. The male connector metal housing 43 partially covers the male connector plastic body 11 and is electrically connected to the male connector PCB 10.

(Male Connector PCB)

Figure 4:
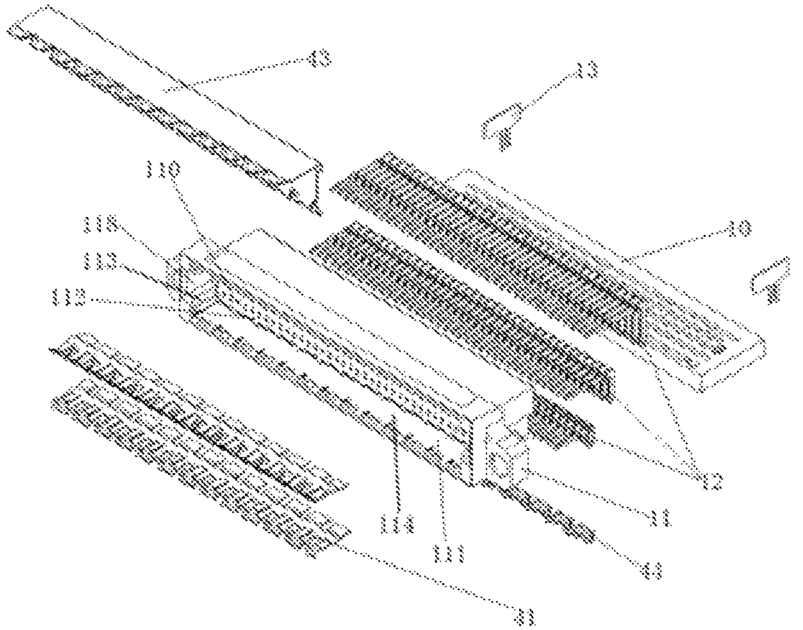
FIG. 4 shows an exploded view of the male connector of the board-to-board connector according to the first embodiment of the present disclosure.
Figure 5:
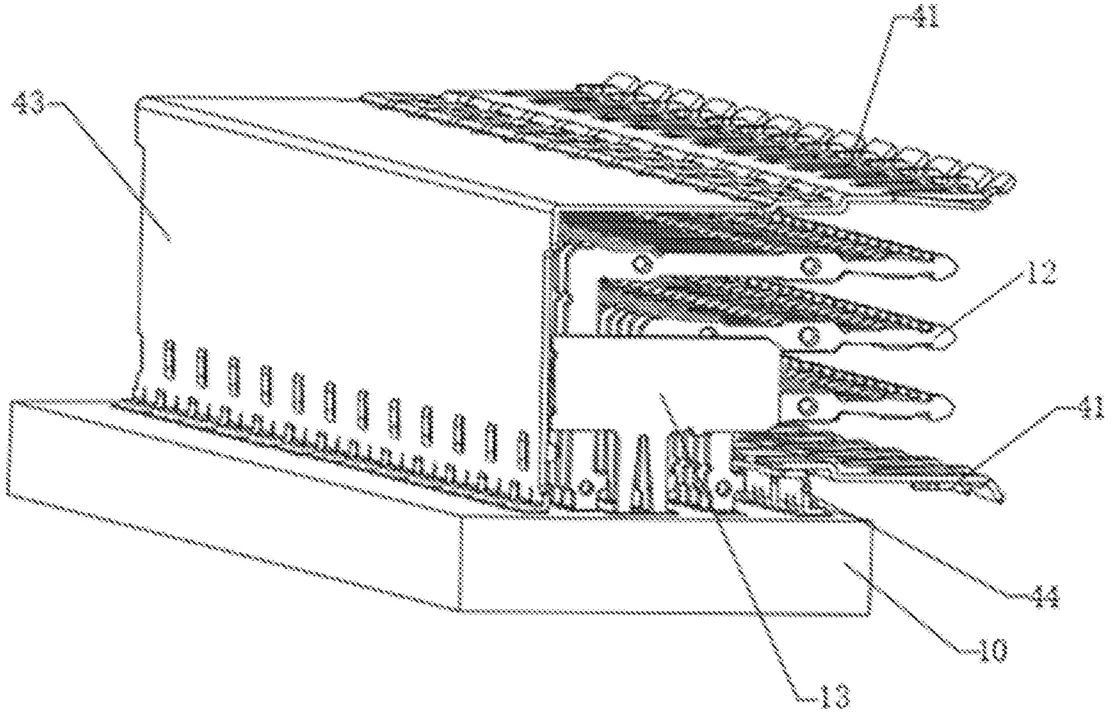
FIG. 5 shows a schematic structural diagram of the male connector, from which the male connector plastic body is removed, of the board-to-board connector according to the first embodiment of the present disclosure.
Figure 12:
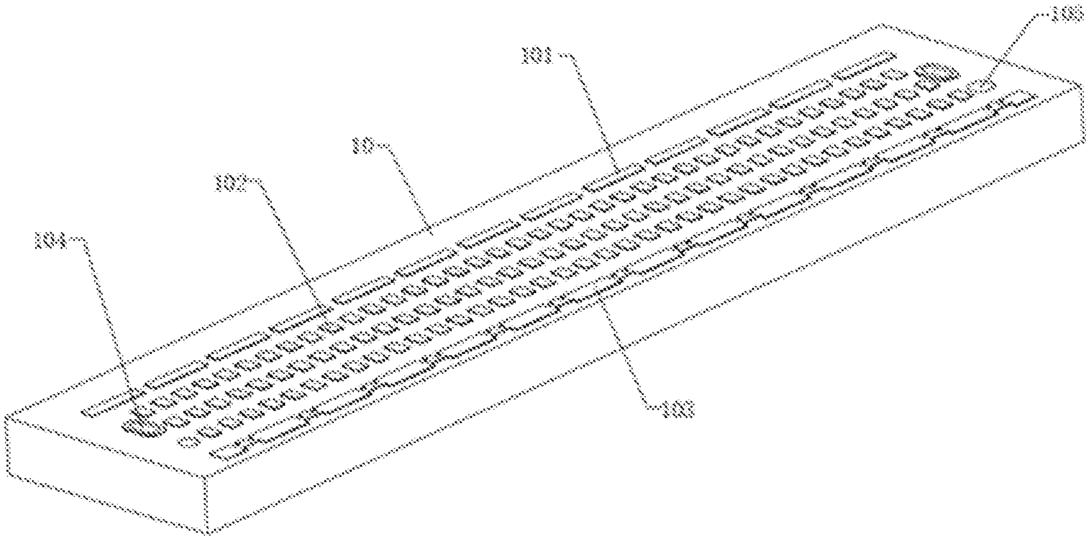
FIG. 12 shows a schematic structural diagram of the male connector PCB of the board-to-board connector according to the first embodiment of the present disclosure.

As shown in FIGS. 4 and 12, the male connector PCB 10 is provided with a first male connector pad 101, a second male connector pad 102, a third male connector pad 103, a PCB slot 104, and a male connector PCB jack 105.

The second male connector pad 102 occupies a majority of the central portion of the main body of the male connector PCB 10. A plurality of second male connector pads 102 are arranged in a row along the length direction X of the male connector PCB 10. In the width direction Y of the male connector PCB 10, the second male connector pads 102 are arranged in a plurality of rows, e.g., three rows. The three rows of the second male connector pads 102 are configured to be connected to the male connector terminal 12 by welding, so that the male connector terminal 12 is welded on the male connector PCB 10.

The first male connector pads 101 and the third male connector pads 103 are located at both sides of the second male connector pads 102 in the width direction Y, respectively. The first male connector pads 101 are configured to be connected to the male connector metal housing 43 by welding, so that the male connector metal housing 43 is welded on the male connector PCB 10. The third male connector pads 103 are configured to be connected to the male connector metal fixing sheet 41 by welding, so that the male connector metal fixing sheet 41 is welded on the male connector PCB 10.

The male connector PCB slots 104 and the male connector PCB jacks 105 are located at both ends of the male connector PCB 10 in the length direction X. The male connector PCB slot 104 and the male connector PCB jacks 105 may penetrate the male connector PCB 10.

The male connector PCB slot 104 is configured to allow the metal sheet at the male connector side 13 to be inserted, so that the male connector PCB 10 and the male connector plastic body 11 are stably connected by means of the metal sheet at the male connector side 13.

The male connector PCB jack 105 is configured to allow the pins extending outwards on the male connector plastic body 11 to be inserted, so that the male connector plastic body 11 and the male connector PCB 10 are stably connected.

(Male Connector Plastic Body)

As shown in FIGS. 1-4 and 9, the male connector plastic body 11 is provided with an accommodating groove 111 that can partially accommodate the female connector 2. The bottom surface 112 of the accommodating groove 111 is provided with a plurality of male connector slots 110, such that the male connector terminal 12 can be inserted in the male connector slots 110.

The top surface of the male connector plastic body 11 is provided with a plastic body slot 117 configured to be connected to the male connector metal housing 43, so that the male connector metal housing 43 and the male connector plastic body 11 are connected stably.

Two first inner surfaces 113 opposite each other in the length direction of the accommodating groove 111 are each provided with a male connector plastic body channel 118, which extends along the thickness direction Z of the male connector 1. The male connector plastic body channel 118 is configured to restrict the female connector 2 from sliding along the thickness direction Z of the male connector 1, so that the female connector 2 is connected to the male connector 1.

Figure 8:
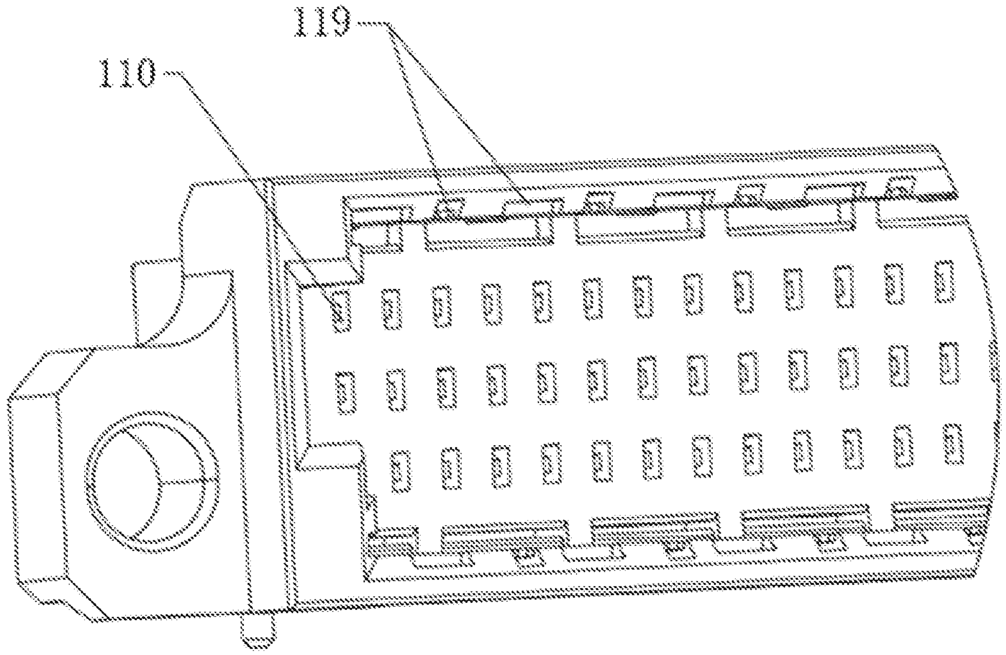
FIG. 8 shows a partial enlarged schematic view of the male connector plastic body of the board-to-board connector according to the first embodiment of the present disclosure.

As shown in FIG. 8, two second inner surfaces 114 opposite each other in the width direction of the accommodating groove 111 are each provided with a male connector plastic body slot 119, which can be seated with the male connector metal fixing sheet 41, so that the male connector metal fixing sheet 41 can be stably mounted.

Figure 9:
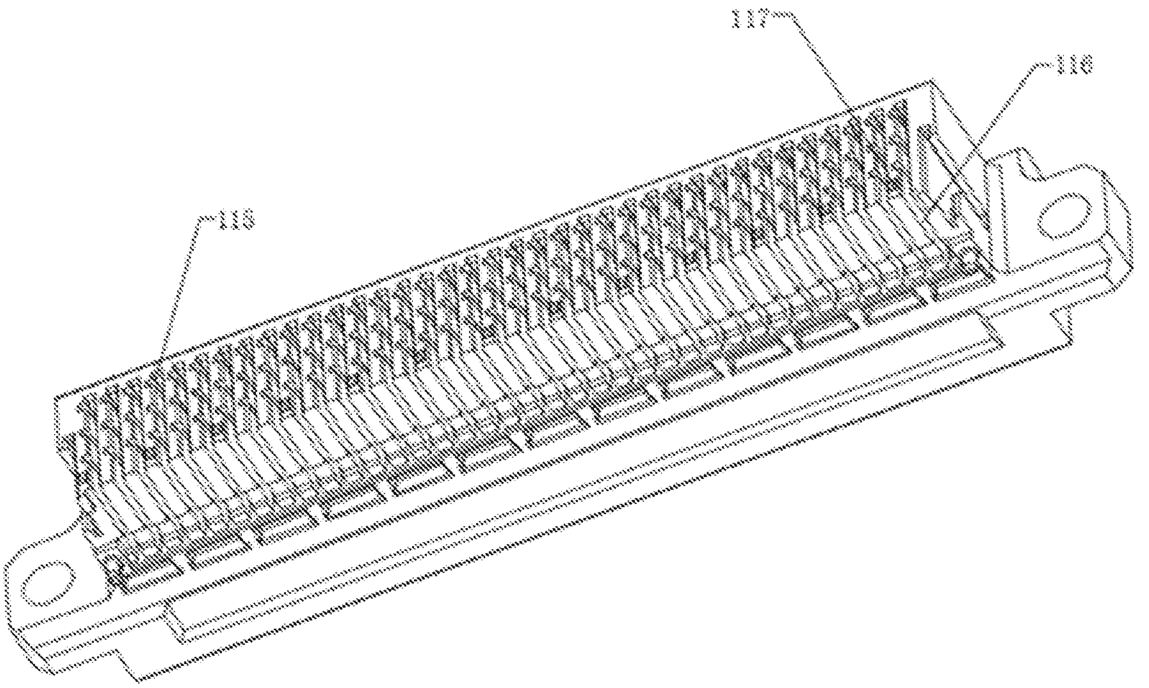
FIG. 9 shows a schematic structural diagram of the male connector plastic body of the board-to-board connector according to the first embodiment of the present disclosure.

As shown in FIG. 9, a first mounting slot 115 is provided on a surface (top surface) of the male connector plastic body 11 in the thickness direction Z. The first mounting slot 115 extends along the thickness direction Z of the male connector plastic body 11, and communicates with the male connector slots 110. A second mounting slot 116 is provided on a surface of the male connector plastic body 11 in the width direction Y. The second mounting slot 116 communicates with the first mounting slot 115, so that the male connector plastic body 11 forms a space for inserting the male connector terminal 12 to facilitate insertion of the male connector terminal 12 into the male connector slots 110.

The male connector plastic body 11 is provided on the surface with outwardly extending pins. The pin can be inserted into the male connector PCB jack 105 to keep stable connecting portion between the male connector plastic body 11 and the male connector PCB 10.

(Male Connector Side Metal Sheet)

As shown in FIGS. 1, 3, 4, and 5, the metal sheet at the male connector side 13 is mounted on both ends of the male connector plastic body 11 in the length direction, through which the male connector plastic body 11 can be stably connected to the male connector PCB 10.

Specifically, the male connector side metal sheet 13 is substantially T-shaped. The male connector side metal sheet 13 is integrally embedded in the male connector plastic body 11. One end of the male connector side metal sheet 13 is inserted into the male connector PCB slot 104, so that the male connector plastic body 11 can be stably connected to the male connector PCB 10.

It can be appreciated that, during production and assembly of the connector, it is necessary to reheat the male connector 1, and in order to prevent the male connector plastic body 11 and the male connector PCB 10 from peeled off as a result of excessive weight on one side of the male connector plastic body 11 during reheating, the male connector side metal sheet 13 is used to connect the male connector plastic body 11 to the male connector PCB 10.

(Male Connector Terminal)

As shown in FIGS. 2 and 4-6, the male connector terminal 12 can be formed in an L shape by bending. The male connector terminal 12 includes a first male terminal portion 121 and a second male terminal portion 122. The first male terminal portion 121 welded on the male connector PCB 10 is perpendicular to the second male terminal portion 122 passing through the male connector slots 110 for electrical connection with the female connector 2.

Since the male connector terminal 12 is L-shaped, the male connector PCB 10 is mounted on a surface of the male connector plastic body 11 in the width direction. The male connector terminal 12 may be a sheet-like structure with the first male terminal portion 121 perpendicular to the male connector PCB 10 and the second male terminal portion 122 parallel to the male connector PCB 10.

There is provided a plurality of male connector terminals 12 that are inserted into the male connector slots 110 in an array arrangement. The plurality of male connector terminals 12 may be provided in multiple sets in the width direction of the male connector 1. For example, the plurality of male connector terminals 12 is provided in three sets in the width direction of the male connector 1. The second male terminal portions 122 of the three sets of male connector terminals 12 have the same length, and the lengths of the first male terminal portions 121 are shortened successively. The first male terminal portion 121 of the male connector terminal 12 closer to the male connector PCB 10 is shorter, and the first male terminal portion 121 of the male connector terminal 12 further away from the male connector PCB 10 is longer, so that multiple sets of first male terminal portions 121 can all be welded on the male connector PCB 10.

Figure 6:
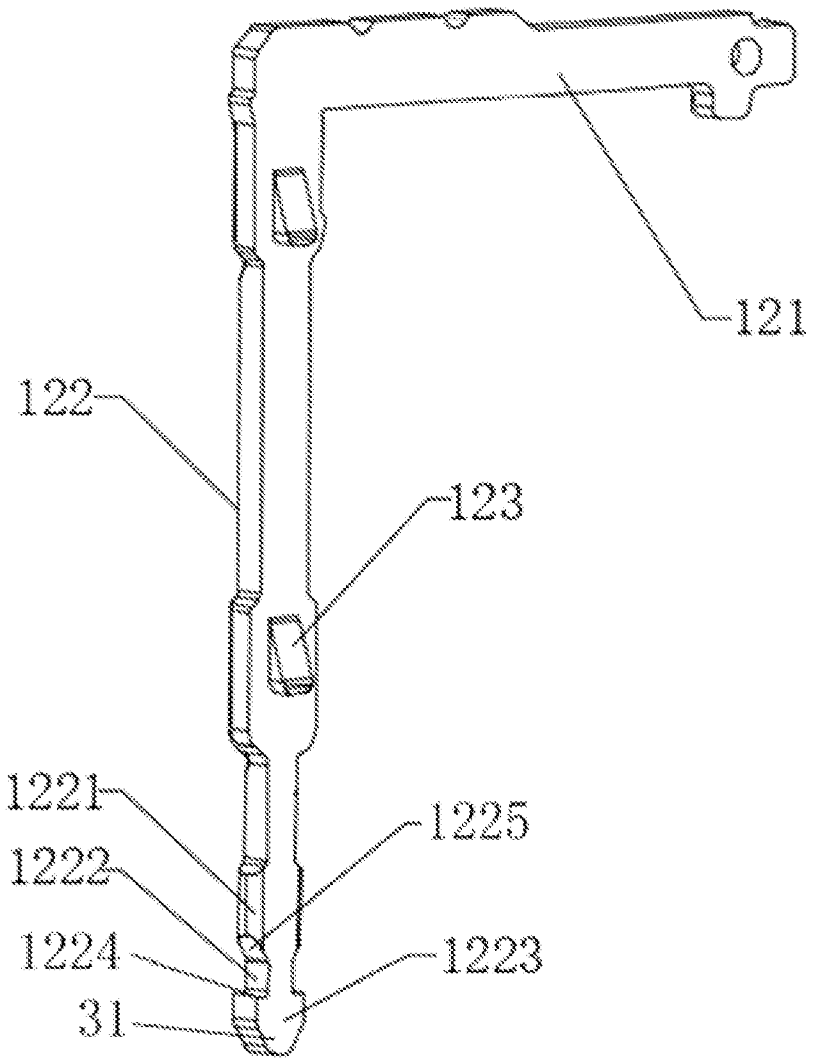
FIG. 6 shows a schematic structural diagram of the male connector terminal of the board-to-board connector according to the first embodiment of the present disclosure.
Figure 18:
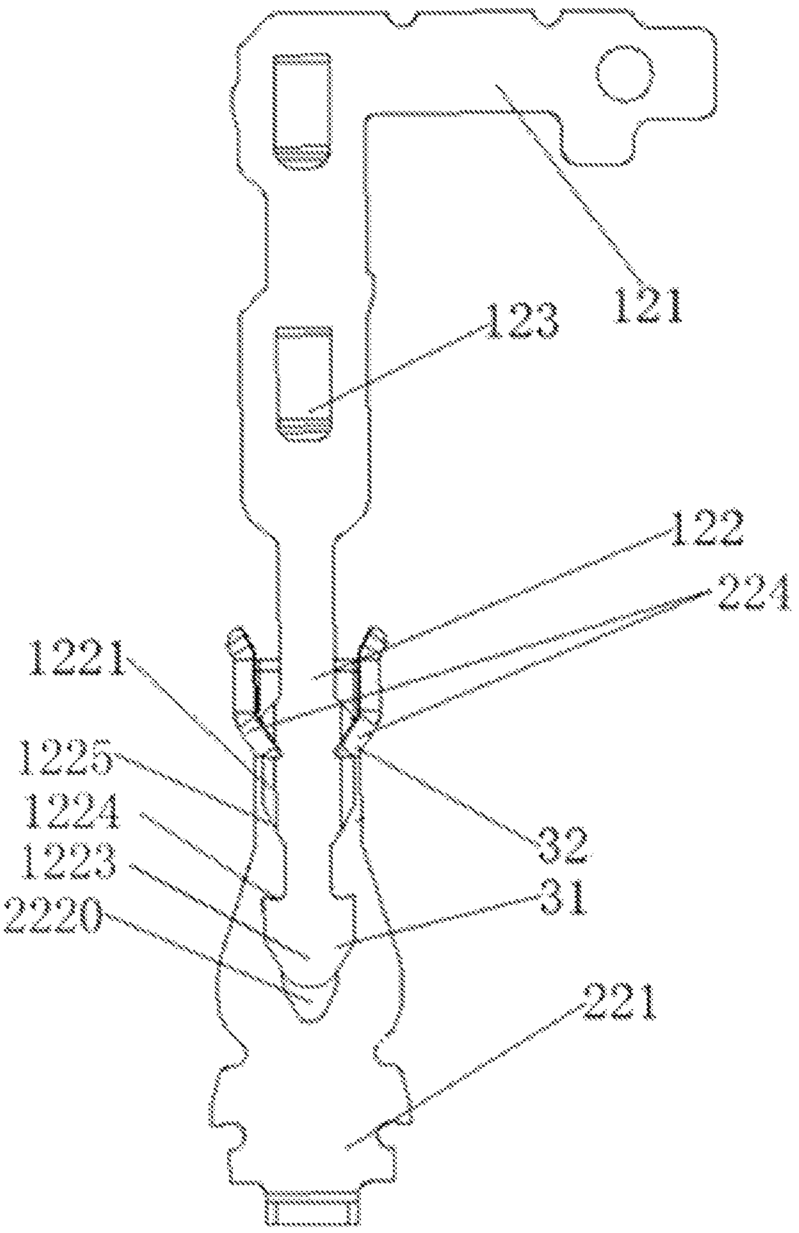
FIG. 18 shows a schematic structural diagram of adaptive installation of the male connector terminal and the female connector terminal of the board-to-board connector according to the first embodiment of the present disclosure.

As shown in FIG. 6, the second male terminal portion 122 includes a first part 31 capable of fitting a second part 32 of the female connector 2 (see FIG. 18). When the male connector 1 is detached from the female connector 2, the second part 32 abuts against the first part 31 to prevent the male connector 1 from detached from the female connector 2.

As shown in FIG. 6, the second male terminal portion 122 includes a male connector contact section 1221, a male connector slot section 1222, and a male connector head section 1223. In the direction where the first male terminal portion 121 points towards the end of the second male terminal portion 122, the male connector contact section 1221, the male connector slot section 1222, and the male connector head section 1223 are connected in sequence. The male connector slot section 1222 and the male connector head section 1223 are configured to be the first part 31. The second male terminal portion 122 is the part inserted into the female connector 2. The male connector contact section 1221, the male connector slot section 1222, and the male connector head section 1223 are all located on the second male terminal portion 122, and they are the part of the male connector 1 electrically connected to the female connector 2.

The width of the male connector contact section 1221 is greater than that of the male connector slot section 1222, and the width of the male connector head section 1223 is greater than that of the male connector slot section 1222.

The male connector head section 1223 may be in a warhead shape that, when inserted into the female connector terminal 22, enables the two engaging arms 224 (see FIG. 18) described below to be pushed apart and plays a guiding role.

The connection part of the male connector head section 1223 and the male connector slot section 1222 forms a stepped portion 1224 that can push the second part 32 when the male connector terminal 12 is detached from the female connector terminal 22, so that the second part 32 is peeled off, and the female connector terminal 22 is damaged and cannot be connected to the male connector 1 again. Preferably, the stepped portion 1224 may be a concave arc surface recessed towards the male connector head section 1223.

The connection part of the male connector contact section 1221 and the male connector slot section 1222 forms a guiding slope 1225. When the male connector terminal 12 is inserted into the female connector 2, the guiding slope 1225 enables two engaging arms 224 to be pushed apart.

The second male terminal portion 122 is provided with a positioning protrusion 123 that is located on one side plate face of the second male terminal portion 122, and a positioning recess adapted to the positioning protrusion 123 is provided inside the male connector slots 110. It is thus easy to ensure the correct installation of the male connector terminal 12 and enable the male connector terminal 12 to be stably accommodated in the male connector slots 110, so that the male connector terminal 12 will not fall into the female connector 2 even when the male connector terminal 12 is peeled off from the male connector PCB 10.

(Male Connector Metal Fixing Sheet)

As shown in FIGS. 2-5 and 7, the male connector metal fixing sheets 41 are arranged at both sides of the male connector terminal 12 in the width direction, and mounted on the inner wall of the accommodating groove 111 of the male connector plastic body 11. The male connector metal fixing sheet 41 not only serves to shield signals, but also to protects the connector.

Figure 7:
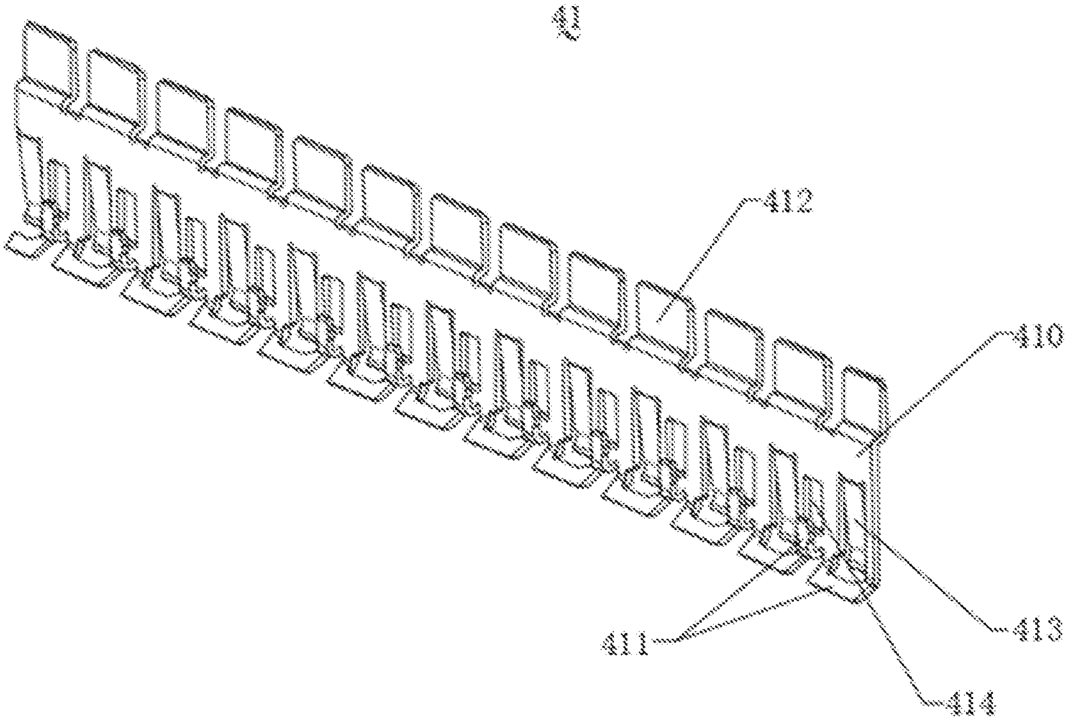
FIG. 7 shows a schematic structural diagram of the male connector metal fixing sheet of the board-to-board connector according to the first embodiment of the present disclosure.

As shown in FIG. 7, the male connector metal fixing sheet 41 includes a male connector fixing body 410, a male connector clasp 411, a male connector contact piece 412, a male connector elastic piece 413, and male connector slots 414.

In the thickness direction of the male connector 1, the male connector clasp 411 is located at one end of the male connector fixing body 410, while the male connector contact piece 412 is located at the other end of the male connector fixing body 410. The male connector clasp 411 is connected to the male connector plastic body slot 119, and the male connector contact piece 412 is electrically connected to the male connector PCB 10. The two male connector metal fixing sheets 41 located at both sides of the male connector 1 in the width direction Y are electrically connected to the male connector PCB 10 by means of the metal housing 43 and the male connector welding metal strip 44, respectively.

One end (upper end) of the male connector elastic piece 413 is resiliently connected to the male connector fixing body 410, and the other end (lower end) of the male connector elastic piece 413 extends towards the side where the male connector plastic body 11 is located (the upper end here is defined in terms of the state in which the female connector 2 is located below the male connector 1 when the male connector 1 is connected to the female connector 2). When the male connector 1 and the female connector 2 are adaptively connected in place, the female connector 2 pushes the male connector elastic piece 413 to deform it and the male connector elastic piece 413 pushes the female connector metal fixing sheet 42 of the female connector 2, thereby causing the male connector 1 and the female connector 2 to press each other and increasing the connection stability.

The male connector slots 414 are formed in the male connector fixing body 410. When the male connector 1 and the female connector 2 are adaptively connected in place, the male connector slots 414 are configured to accommodate the female connector elastic pieces 423 of the female connector 2 (see FIG. 16), increasing the difficulty in detachment of the male connector 1 from the female connector 2.

(Male Connector Metal Housing)

Figure 10:
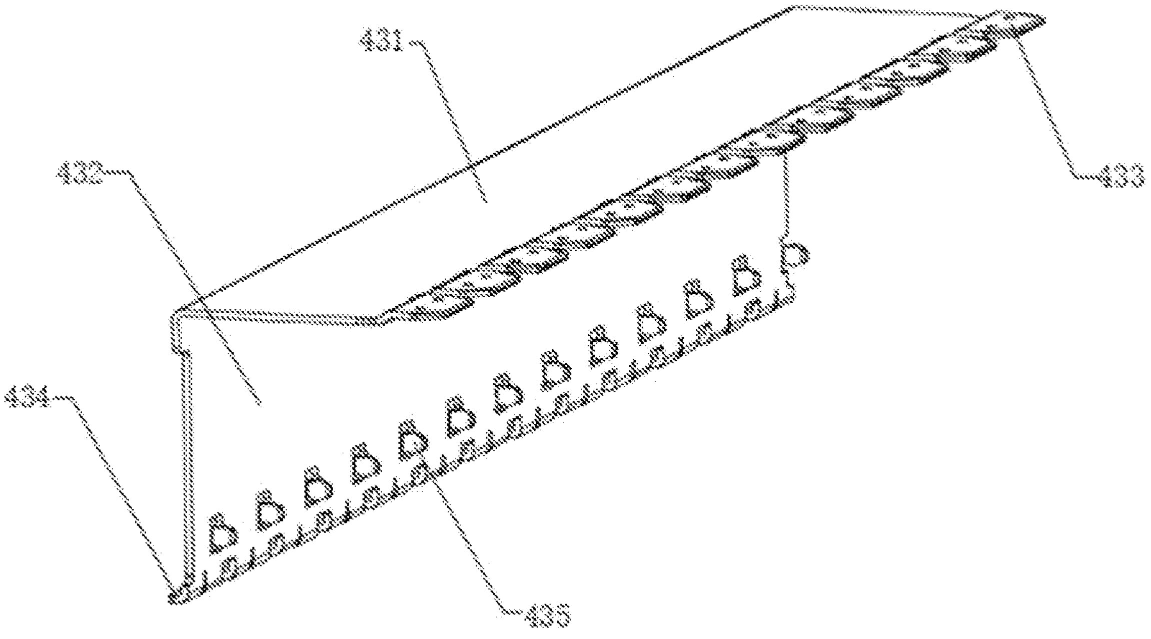
FIG. 10 shows a schematic structural diagram of the male connector metal housing of the board-to-board connector according to the first embodiment of the present disclosure.

As shown in FIG. 10, the male connector metal housing 43 has an L-shaped cross section, and is configured to cover the side surface and the top surface of the male connector plastic body 11. The male connector metal housing 43 includes a first housing body 431 and a second housing body 432 that are connected perpendicularly.

The end of the first housing body 431 is provided with a housing contact piece 433 configured to contact the male connector contact piece 412 for electrical connection. The end of the second housing body 432 is provided with a housing welding piece 434 configured to be welded to the first male connector pad 101 of the male connector PCB 10.

The second housing body 432 is provided with a plurality of raised housing clasp pieces 435 on the side facing the male connector plastic body 11. The housing clasp piece 435 is configured to fit the plastic body slot 117 on the outer wall of the male connector plastic body 11, so that the male connector metal housing 43 is stably connected to the male connector plastic body 11.

(Male Connector Welding Metal Strip)

Figure 11:
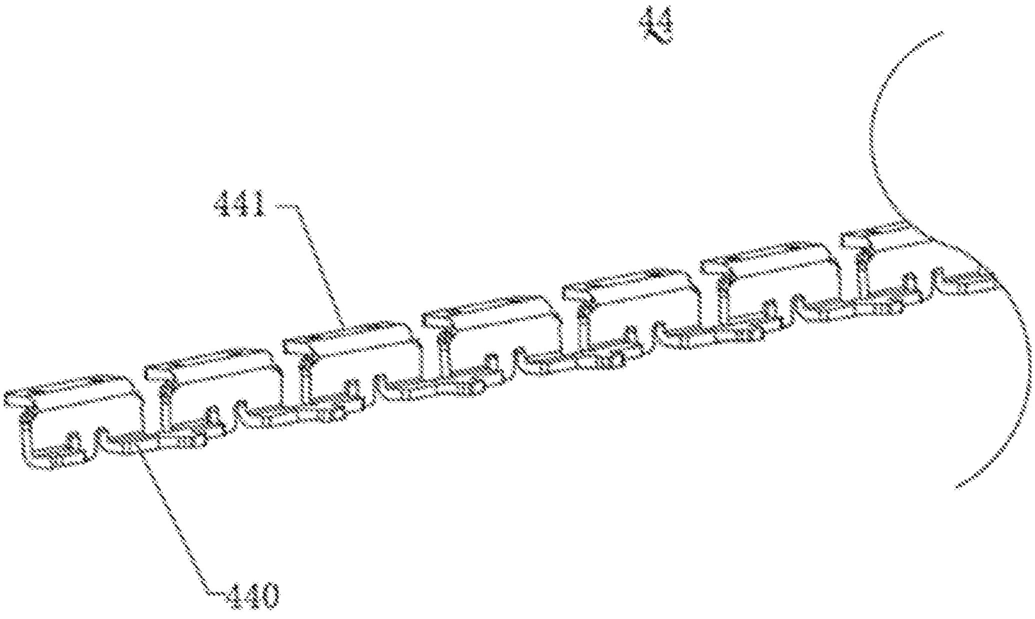
FIG. 11 shows a partial enlarged schematic view of the male connector welding metal strip of the board-to-board connector according to the first embodiment of the present disclosure.

As shown in FIG. 11, the male connector welding metal strip 44 includes a metal strip welding piece 440 welded to the third male connector pad 103 and a metal strip contact piece 441 in contact with the male connector contact pieces 412, so as to enable the male connector PCB 10 to be electrically connected to the male connector metal fixing sheets 41 via the male connector welding metal strip 44.

(Female Connector)

As shown in FIGS. 1, 2, and 13-19, the female connector 2 includes a female connector plastic body 21, a female connector PCB 20, a female connector terminal 22, and female connector metal fixing sheets 42. The female connector plastic body 21 is connected to the female connector PCB 20, and the female connector terminal 22 and the female connector metal fixing sheets 42 are all welded on the female connector PCB 20.

(Female Connector Plastic Body)

Figure 13:
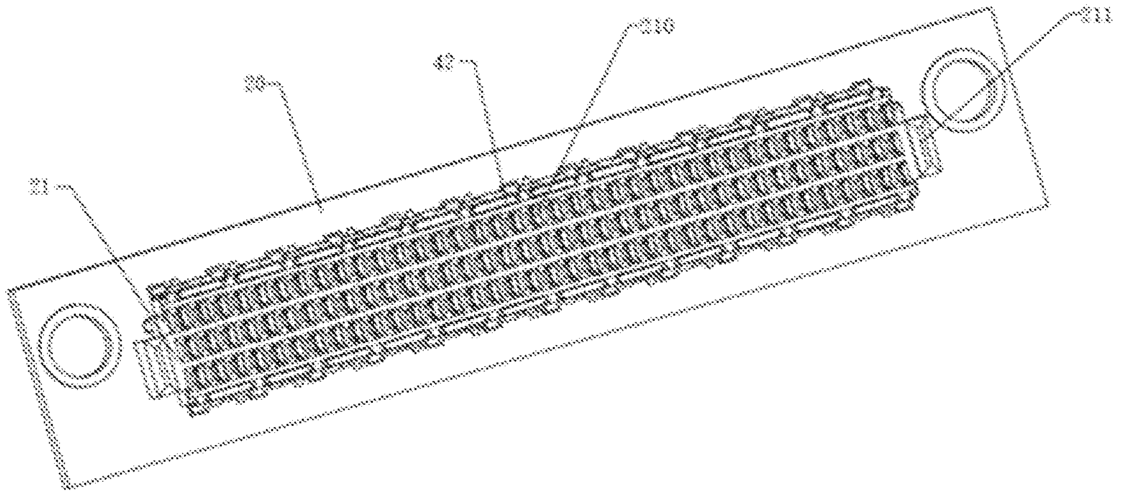
FIG. 13 shows a schematic structural diagram of the female connector of the board-to-board connector according to the first embodiment of the present disclosure.
Figure 14:
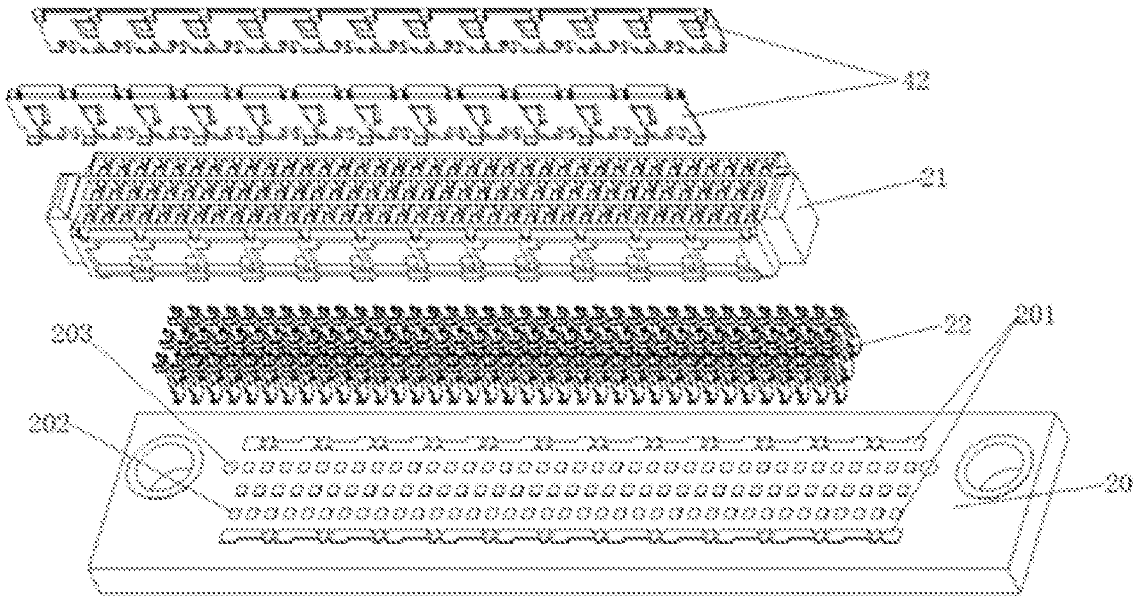
FIG. 14 shows an exploded view of the female connector of the board-to-board connector according to the first embodiment of the present disclosure.
Figure 15:
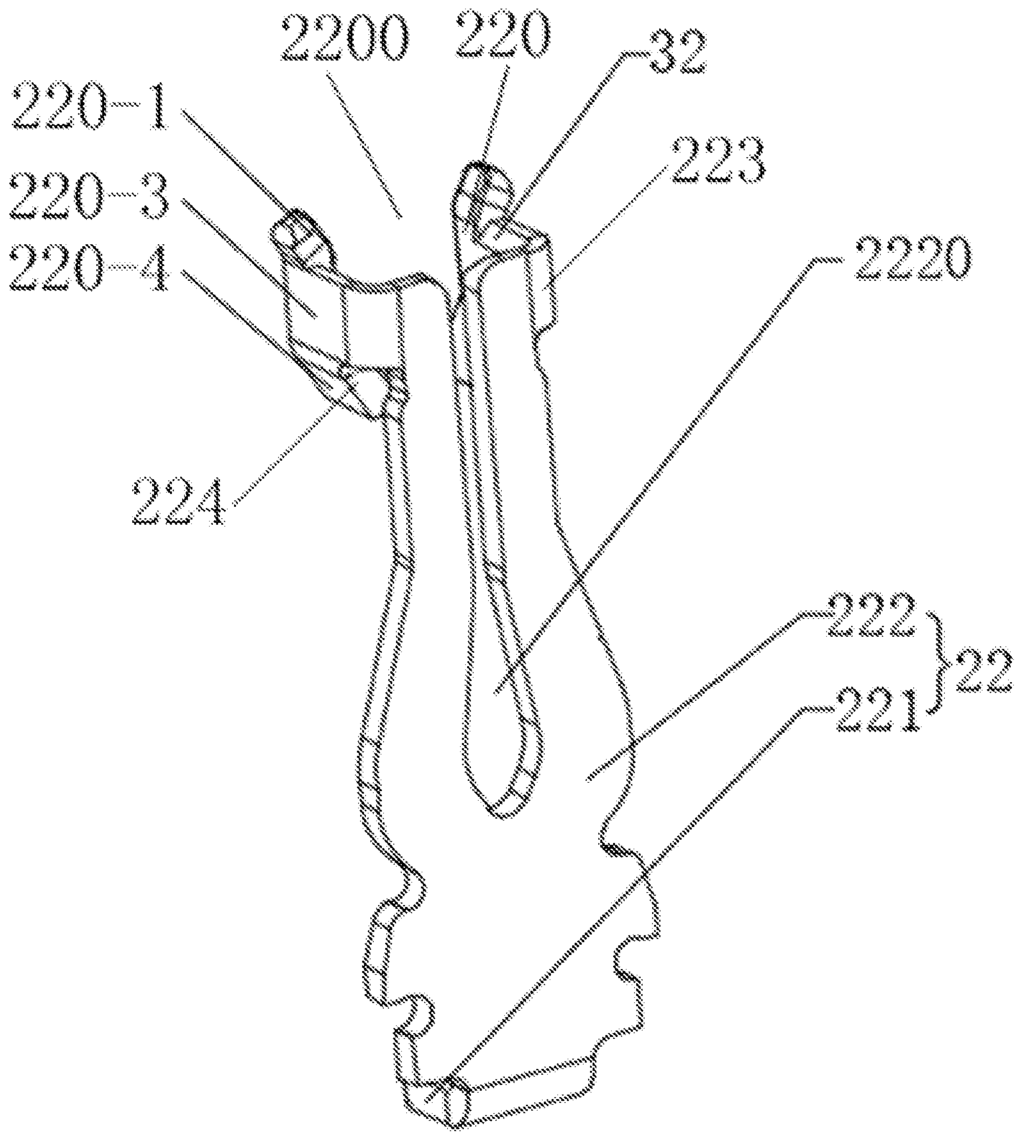
FIG. 15 shows a schematic structural diagram of the female connector terminal of the board-to-board connector according to the first embodiment of the present disclosure.

As shown in FIGS. 13 and 14, the female connector plastic body 21 can be a cubic block provided with a plurality of female connector slots 210. The plurality of female connector slots 210 is arranged in an array, and penetrate the female connector plastic body 21 along the thickness direction of the female connector plastic body 21. The female connector terminal 22 is mounted in the female connector slot 210. The female connector terminal 22 includes a female connector body 221 and a female connector elastic arm portion 222. The female connector body 221 and the female connector PCB 20 are welded together, and the female connector elastic arm portion 222 is embedded within the female connector slot 210. When the male connector 1 is connected to the female connector 2, the second male terminal portion 122 can be inserted in the female connector slot 210 and brought into contact with the female connector terminal 22.

Figure 17:
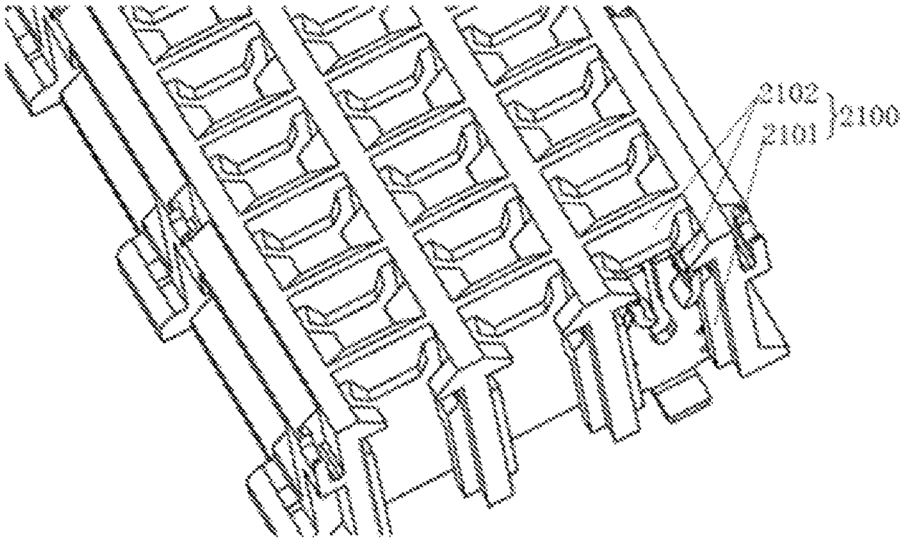
FIG. 17 shows a partial enlarged schematic view of the female connector plastic body and the female connector terminal of the board-to-board connector according to the first embodiment of the present disclosure.

As shown in FIG. 17, a female terminal restricting structure 2100 is provided in the female connector slot 210. The female terminal restricting structure 2100 includes a female terminal lower restricting portion 2101 and a female terminal upper restricting portion 2102.

The female terminal lower restricting portions 2101 can be located on both side surfaces of the female connector slot 210 in the width direction, so as to restrict the movement of the female connector terminal 22 within the female connector slot 210 along the width direction. The female terminal upper restricting portions 2102 are approximate to the opening portion of the female connector slot 210. The female terminal upper restricting portions 2102 is configured to restrict the movement of the female connector terminal 22 within the female connector slot 210 along the length direction, such that the female connector terminal 22 is restricted to fit the inner wall of the female connector slot 210, increasing the stability of the female connector terminal 22 in the female connector slot 210.

The female connector terminal 22 is attached to the inner wall of the female connector slot 210 by means of the female terminal restricting structure 2100, and the engaging portion 220 as described below of the female connector terminal 22 is aligned with the opening of the female connector slot 210, such that when the male connector terminal 12 is inserted into the female connector slot 210, the male connector terminal 12 is only in contact with the engaging portion 220 but not the rest of the female connector terminal 22.

The female connector plastic body 21 is provided with female connector plastic body protrusions 211 at both ends thereof in the length direction X. When the male connector 1 and the female connector 2 are adaptively installed, the female connector plastic body protrusion 211 can slide along the male connector plastic body channel 118 to facilitate adaptive installation of the female connector plastic body 21 and the male connector plastic body 11.

(Female Connector PCB)

As shown in FIG. 14, the female connector PCB 20 is provided with a first female connector pad 201, a second female connector pad 202, and a female connector PCB jack 203. There is provided with a plurality of second female connector pads 202 that occupy a majority of the central portion of the main body of the female connector PCB 20. The plurality of second female connector pads 202 is arranged in a row along the length direction of the female connector PCB 20. In the width direction of the female connector PCB 20, the second female connector pads 202 are arranged in multiple rows, e.g., three rows. The three rows of second female connector pads 202 are configured to be connected to the female connector terminal 22 by welding, so that the female connector terminal 22 is welded on the female connector PCB 20.

The first female connector pads 201 may be provided in two rows, and the two rows of first female connector pads 201 are located on both sides of the second female connector pads 202 in the width direction Y. The first female connector pad 201 is configured to be connected to the female connector metal fixing sheet 42 by welding, so that the female connector metal fixing sheet 42 is welded on the female connector PCB 20.

The female connector PCB jack 203 is configured to enable pins of the female connector plastic body 21 to be inserted.

(Female Connector Terminal)

As shown in FIGS. 13-19, the female connector terminal 22 includes a female connector body 221, a female connector elastic arm portion 222, and an engaging portion 220.

The female connector elastic arm portion 222 can be formed by the upward extension of the female connector body 221, and the engaging portion 220 overhangs the female connector elastic arm portion 222. The engaging portion 220 is configured to bring the female connector terminal 22 into contact with the male connector terminal 12, and restrict detachment of the male connector terminal 12 from the female connector terminal 22. The engaging portion 220 can serve as the second part 32 adapted to the first part 31.

The female connector elastic arm portion 222 includes an elastic arm body and an elastic arm groove 2220 provided on the elastic arm body, and the elastic arm groove 2220 divides the elastic arm body into two female connector elastic pieces. The engaging portion 220 includes two engaging arms 224 that may be symmetrical with respect to the elastic arm groove 2220 and enclose an engagement space 2200. The two engaging arms 224 can be arranged on the upper portions of the two female connector elastic pieces, respectively.

The engagement space 2200 includes, from top to bottom, a guiding section 220-1, a transition section 220-3, and a restricting section 220-4. The upper portion of the engagement space 2200 is approximate to the opening portion of the female connector slot 210, and the lower portion of the engagement space 2200 is approximate to the bottom of the female connector slot 210.

In the direction of inserting the male connector terminal 12 into the engaging portion 220, the guiding section 220-1 is located on the upstream of the restricting section 220-4, and the side surfaces of the two engaging arms 224 that define the guiding section 220-1 are tapered in an inverted "splay" shape, so that the engaging arms 224 can guide the male connector terminal 12 into the engagement space 2200.

In the direction of inserting the male connector terminal 12 into the engaging portion 220, the restricting section 220-4 is located on the downstream of the guiding section 220-1, and the side surfaces of the two engaging arms 224 that define the restricting section 220-4 are tapered in an inverted "splay" shape.

As shown in FIG. 18, in the state where the male connector terminal 12 and the female connector terminal 22 are adaptively installed, the male connector contact section 1221 is in contact with the side surfaces of the two engaging arms 224 that define the restricting section 220-4. The male connector contact section 1221 pushes the engaging arms 224 apart, and the male connector head section 1223 and a part of the male connector slot section 1222 are located outside of the engagement space 2200.

The width of the male connector contact section 1221 and the male connector head section 1223 is greater than the width of the restricting section 220-4 when the engaging arms 224 are in the natural state. When the male connector terminal 12 is detached from the female connector terminal 22, the stepped portion 1224 can push the engaging arms 224, causing the engaging arms 224 to be peeled off, and the female connector terminal 22 to be damaged.

The transition section 220-3 is located between the guiding section 220-1 and the restricting section 220-4. The side surfaces of the two engaging arms 224 that define the transition section 220-3 may be parallel to each other. The part of the engaging arm 224 that defines the transition section 220-3 is connected to the female connector elastic piece.

(Female Connector Metal Fixing Sheet)

As shown in FIGS. 13 and 14, the female connector metal fixing sheets 42 are arranged at both sides of the female connector terminal 22 in the width direction, and mounted on the outer wall of the female connector plastic body 21. The female connector metal fixing sheet 42 not only serves to shield signals, but also enables the female connector plastic body 21 to be stably installed on the female connector PCB 20.

Figure 16:
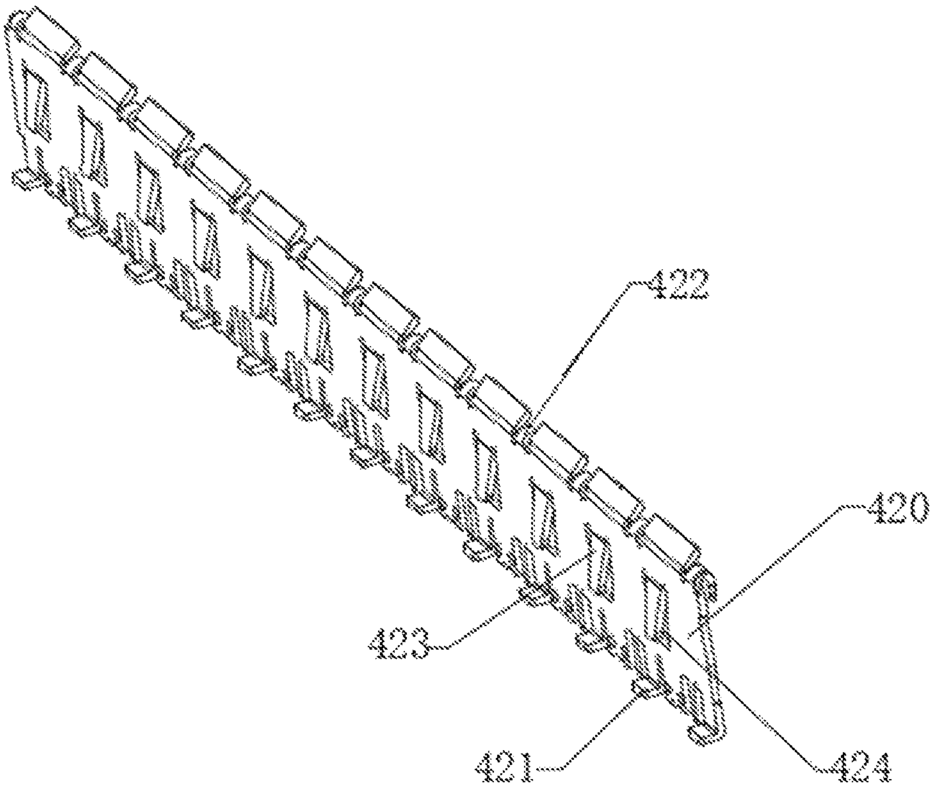
FIG. 16 shows a schematic structural diagram of the female connector metal fixing sheet of the board-to-board connector according to the first embodiment of the present disclosure.

As shown in FIGS. 14 and 16, the female connector metal fixing sheet 42 includes a female connector fixing body 420, a female connector contact piece 421, a female connector clasp 422, a female connector elastic piece 423, and an elastic piece slot 424.

In the thickness direction of the female connector 2, the female connector contact piece 421 is located on one end of the female connector fixing body 420, while the female connector clasp 422 is located on the other end of the female connector fixing body 420. The female connector contact piece 421 is welded on the first female connector pad 201, so that the female connector contact piece 421 is electrically connected to the female connector PCB 20. The female connector clasp 422 fits the female connector slot of the female connector plastic body 21, such that the female connector metal fixing sheet is connected to the female connector plastic body 21.

One end (upper end) of the female connector elastic piece 423 is resiliently connected to the female connector fixing body 420, and the other end (lower end) of the female connector elastic piece 423 extends towards the outer side away from the female connector plastic body 21 (the upper end here is defined in terms of the state in which the female connector 2 is located below the male connector 1 when the male connector 1 is connected to the female connector 2). When the male connector 1 is connected to the female connector 2, the female connector elastic piece 423 can be adapted to the male connector slot 414. A plurality of female connector elastic pieces 423 may be provided along the length direction of the female connector fixing body 420.

The elastic piece slot 424 is formed in the female connector fixing body 420. The positions of the elastic piece slot 424 may correspond to the female connector elastic piece 423, that is, one end (upper end) of the female connector elastic piece 423 is connected to the upper edge of the elastic piece slot 424.

Figure 19:
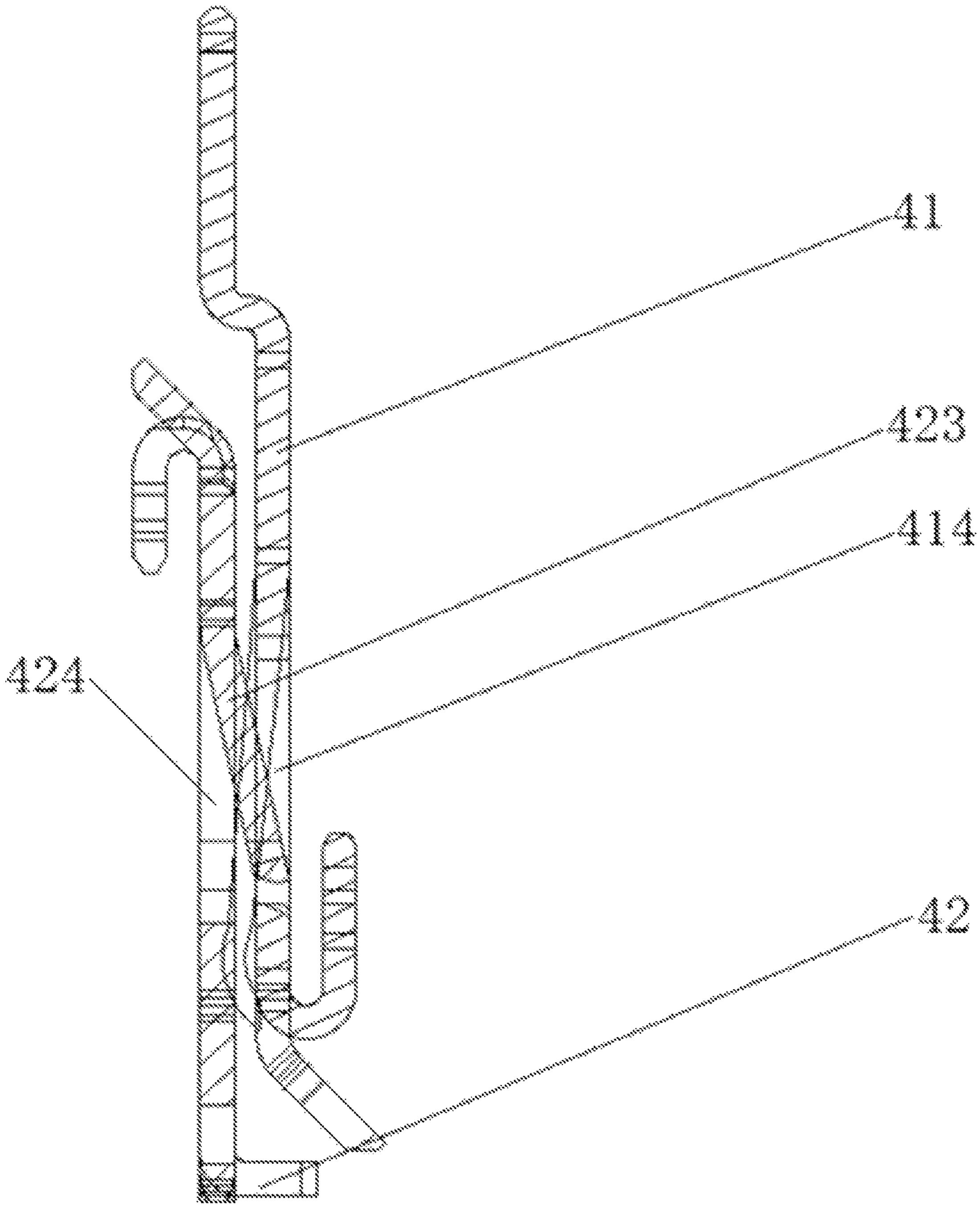
FIG. 19 shows a schematic structural diagram of adaptive installation of the male connector metal fixing sheet and the female connector metal fixing sheet of the board-to-board connector according to the first embodiment of the present disclosure.

During the installation of the male connector 1 on the female connector 2, the male connector metal fixing sheet 41 can push the female connector elastic piece 423 to deform it towards the female connector plastic body 21. As shown in FIG. 19, the female connector elastic piece 423 may recover after the female connector elastic piece 423 enters the male connector slot 414. When the male connector 1 is attempted to be detached from the female connector 2, i.e., moving the male connector 1 away from the female connector 2, the female connector elastic piece 423 will abut against the edge of the male connector slot 414 such that the female connector elastic piece 423 cannot be detached from the male connector slot 414. If the male connector 1 is forcibly detached from the female connector 2, the female connector elastic piece 423 will be damaged, and the female connector 2 does not work properly.

Second Embodiment

In the present disclosure, the board-to-board connector of the second embodiment and the board-to-board connector of the first embodiment have substantially the same structure, so the same or similar structures will not be repeated and will be denoted by the same reference signs. The differences between the board-to-board connectors of the second embodiment and the first embodiment include the structures of the male connector terminal and the female connector terminal.

(Male Connector Terminal)

Figure 20:
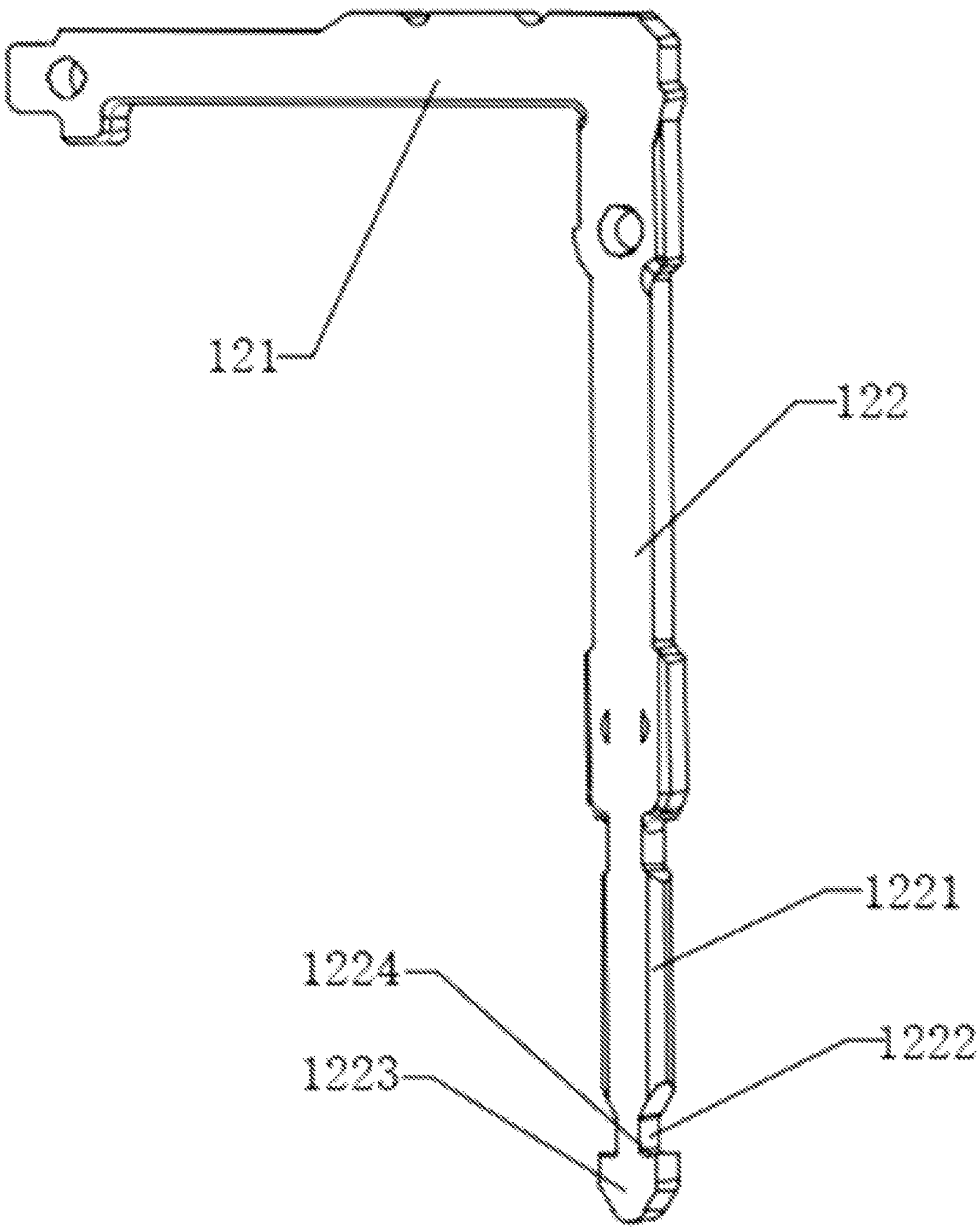
FIG. 20 shows a schematic structural diagram of the male connector terminal of the board-to-board connector according to the second embodiment of the present disclosure.
Figure 23:
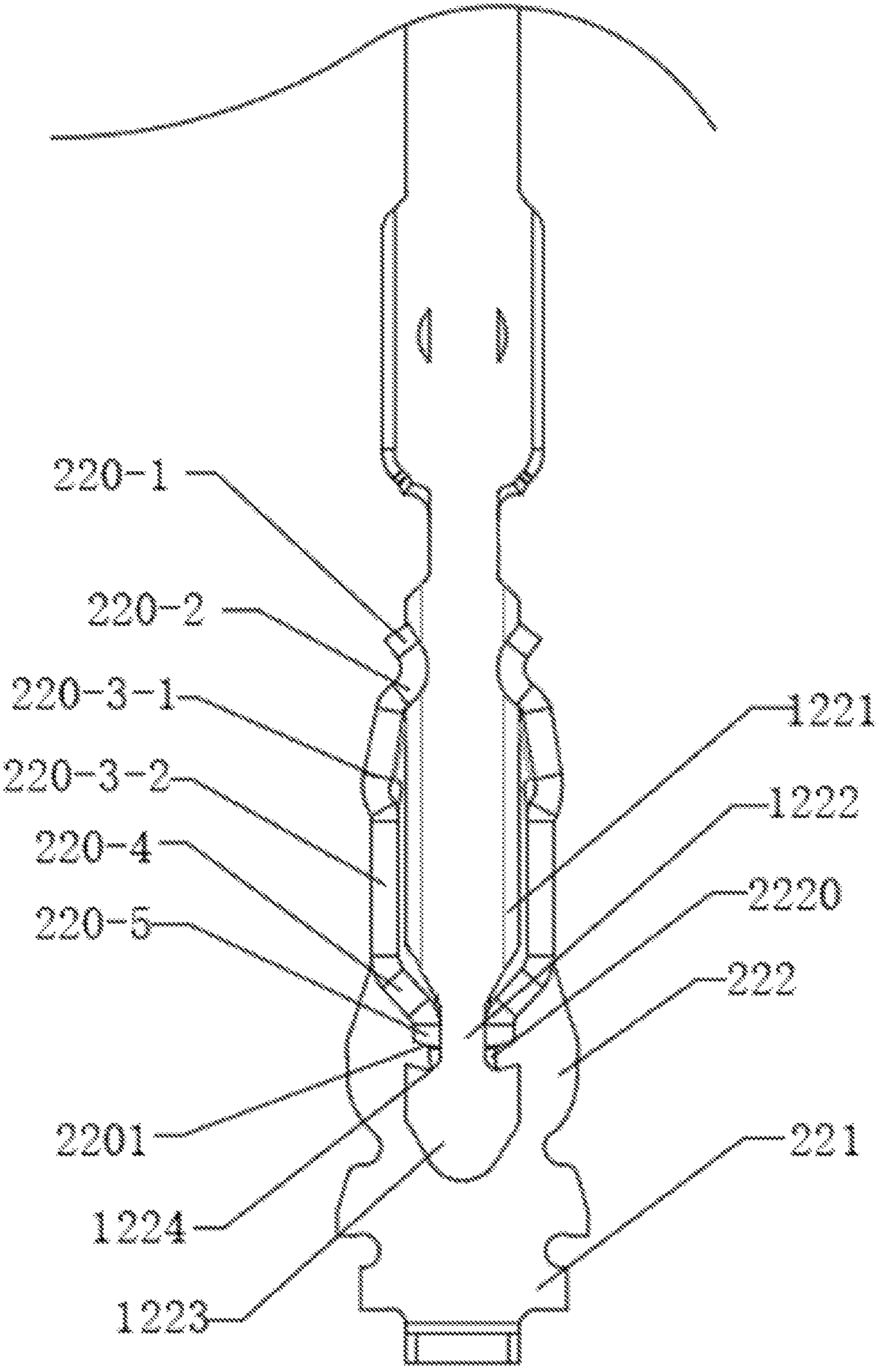
FIG. 23 shows a schematic structural diagram of adaptive installation of the male connector terminal and the female connector terminal of the board-to-board connector according to the second embodiment of the present disclosure.

As shown in FIGS. 20 and 23, the male connector terminal 12 can be formed in an L shape by bending. The male connector terminal 12 includes a first male terminal portion 121 and a second male terminal portion 122. The first male terminal portion 121 is perpendicular to the second male terminal portion 122, and welded on the male connector PCB 10. The second male terminal portion 122 penetrates the male connector slot 110 and configured to be electrically connected to the female connector 2.

(Female Connector Terminal)

Figure 21:
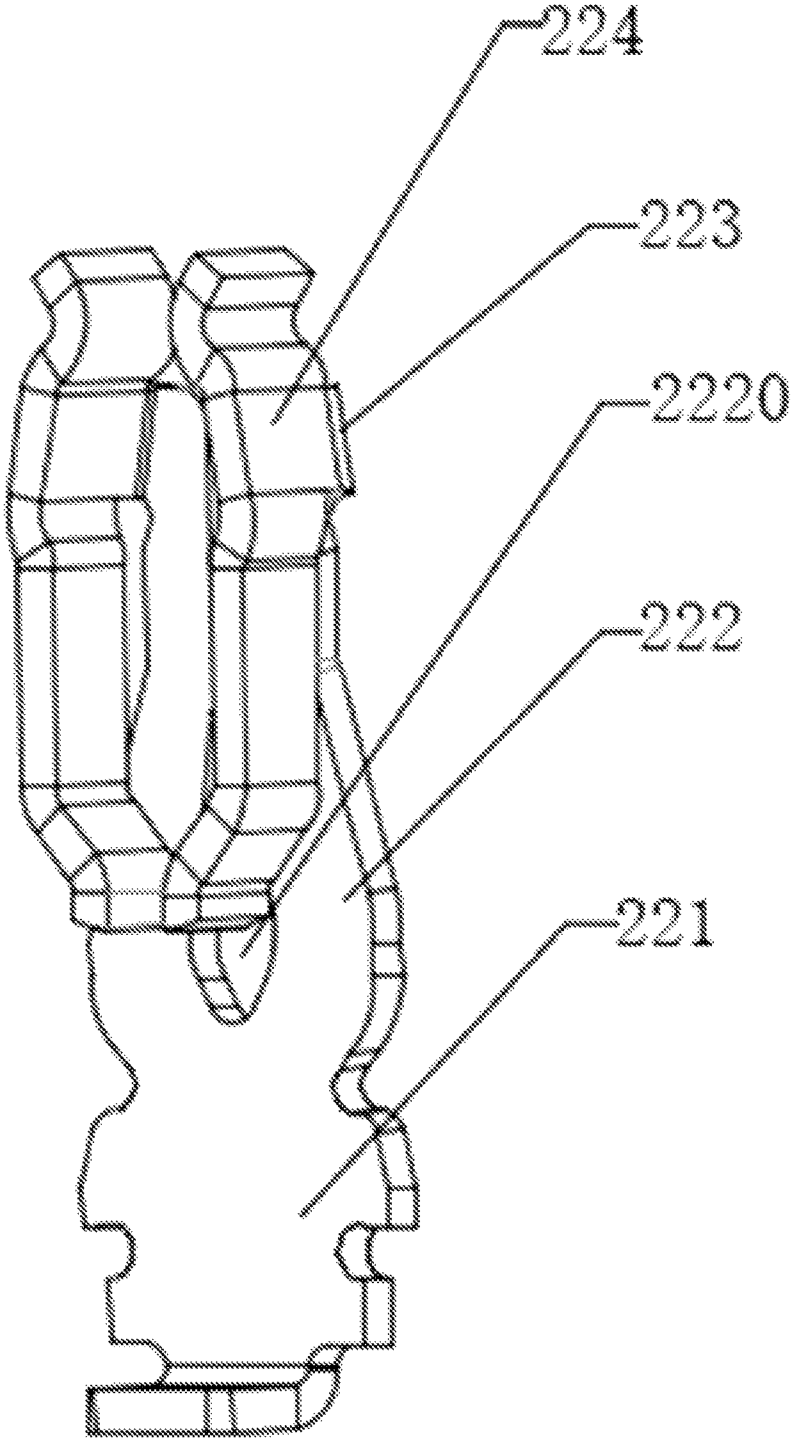
FIG. 21 shows a schematic structural diagram of the female connector terminal of the board-to-board connector according to the second embodiment of the present disclosure.
Figure 22:
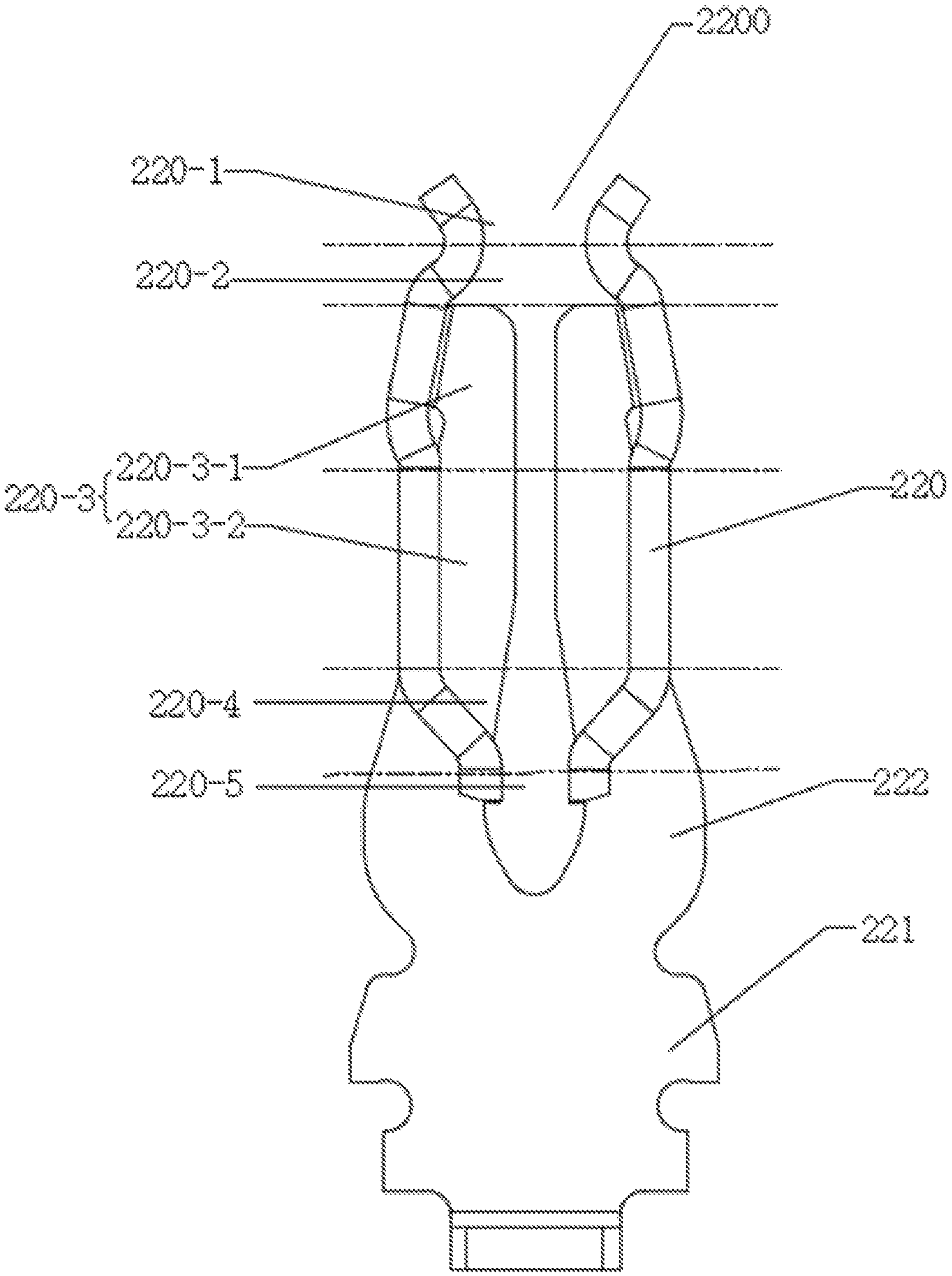
FIG. 22 shows a schematic structural diagram of another perspective of the female connector terminal of the board-to-board connector according to the second embodiment of the present disclosure.

As shown in FIGS. 21-23, the female connector terminal 22 includes a female connector body 221, a female connector elastic arm portion 222, and an engaging portion 220.

The female connector elastic arm portion 222 can be formed by the upward extension of the female connector body 221, and the engaging portion 220 overhangs the female connector elastic arm portion 222. The engaging portion 220 is configured to bring the female connector terminal 22 into contact with the male connector terminal 12, and restrict detachment of the male connector terminal 12 from the female connector terminal 22.

The female connector elastic arm portion 222 includes an elastic arm body and an elastic arm groove 2220 provided on the elastic arm body, which divides the elastic arm body into two female connector elastic arms. The engaging portion 220 includes two engaging arms 224 that may be symmetrical with respect to the elastic arm groove 2220 and enclose an engagement space 2200. The two engaging arms 224 can be arranged on the upper portions of the two female connector elastic pieces, respectively.

The two engaging arms 224 are a plate-like structure. The engaging arms 224 can be bent several times to form an engaging portion 220, one side of which is connected to the female connector elastic piece by means of the connection piece 223.

The engagement space 2200 includes, from top to bottom, a guiding section 220-1, a holding section 220-2, a transition section 220-3, a restricting section 220-4, and a clamping section 220-5. The upper portion of the engagement space 2200 is approximate to the opening portion of the female connector slot 210, and the lower portion of the engagement space 2200 is approximate to the bottom of the female connector slot 210.

The holding section 220-2 is located between the guiding section 220-1 and the transition section 220-3. In the direction of inserting the male connector terminal 12 into the engaging portion 220, the width of the holding section 220-2 gradually increases, and the side surfaces of the two engaging arms 224 that define the holding section 220-2 are in a "splay" shape.

The width of the male connector contact section 1221 and the male connector head section 1223 is greater than the width of the holding section 220-2 and the restricting section 220-4 when the engaging arm 224 is in the natural state, so that when the male connector terminal 12 is inserted in the female connector terminal 22, the parts of the two engaging arms 224 that define the holding section 220-2 and the restricting section 220-4 are pushed apart, and clamp the male connector contact section 1221, thereby increasing the contact performance between the male connector terminal 12 and the female connector terminal 22.

The surfaces of the two engaging arms 224 that define the holding section 220-2 may be a arc surface protruding towards the engagement space 2200. The contact between the male connector contact section 1221 and the two engaging arms 224 that define the holding section 220-2 is arc surface contact, which renders their contact more stable.

The width of the male connector slot section 1222 is greater than the width of the restricting section 220-4 and the clamping section 220-5 when the engaging arm 224 is in the natural state, so that when the male connector terminal 12 is inserted in the female connector terminal 22, the parts of the two engaging arms 224 that define the restricting section 220-4 and the clamping section 220-5 are pushed apart, and clamp the male connector slot section 1222, thereby increasing the contact performance between the male connector terminal 12 and the female connector terminal 22.

The transition section 220-3 includes a first transition subsection 220-3-1 and a second transition subsection 220-3-2. The first transition subsection 220-3-1 is located on the upper end of the second transition subsection 220-3-2.

The upper end of the first transition subsection 220-3-1 is connected to the lower end of the holding section 220-2. The width of the first transition subsection 220-3-1 gradually increases from top to bottom in the direction of inserting the male connector terminal 12 into the engaging portion 220. The side surfaces of the two engaging arms 224 that define the first transition subsection 220-3-1 forms an angle with the central axis of the engagement space 2200.

The part of the engaging arm 224 that defines the first transition subsection 220-3-1 is connected to the female connector elastic piece by means of the connection piece 223. The lower end of the holding section 220-2 is flush with the upper end of the female connector elastic piece, that is, the holding section 220-2 and the guiding section 220-1 are located above the female connector elastic piece. In the direction of inserting the male connector terminal 12 into the engaging portion 220, the engaging arm 224 rotates on the first transition subsection 220-3-1, which enables the engaging arm 224 that defines the restricting section 220-4 to clamp inwards more tightly.

The upper end of the second transition subsection 220-3-2 is connected to the lower end of the first transition subsection 220-3-1, and the lower end of the second transition subsection 220-3-2 is connected to the upper end of the restricting section 220-4. The width of the second transition subsection 220-3-2 may remain constant from top to bottom. The surfaces of the two engaging arms 224 that define the second transition subsection 220-3-2 are parallel to the central axis of the engagement space 2200.

In the direction of inserting the male connector terminal 12 into the engaging portion 220, the clamping section 220-5 is provided at the end of the restricting section 220-4, and the width of the clamping section 220-5 may remain constant from top to bottom.

The inner wall of the engaging arm 224 that defines the clamping section 220-5 is parallel to the central axis of the engagement space 220. Moreover, the lower end face 2201 of the clamping section 220-5 is an inclined plane or a convex arc face adapted to the concave arc surface of the connection surface of the male connector head section 1223 and the male connector slot section 1222, that is, the restricting section 220-4 and the clamping section 220-5 are located within the male connector slot section 1222.

The bottom of the engaging arm 224 that defines the clamping section 220-5 may be a convex arc face adapted to the concave arc surface of the stepped portion 1224, or a plane.

As shown in FIG. 23, in the state where the male connector terminal 12 and the female connector terminal 22 are adaptively installed, the male connector contact section 1221 is in contact with the side surfaces of the two engaging arms 224 that define the holding section 220-2, and the male connector slot section 1222 is in contact with the side surface of the engaging arm 224 that defines the clamping section 220-5. The male connector head section 1223 and a part of the male connector slot section 1222 are located outside of the engagement space 2200.

The width of the male connector head section 1223 is greater than the width of the restricting section 220-4 and the clamping section 220-5 when the engaging arm 224 is in the natural state. When the male connector terminal 12 is detached from the female connector terminal 22, the stepped portion 1224 is capable of pushing the engaging arms 224 to cause the engaging arms 224 to be peeled off, and the female connector terminal 22 to be damaged.

Preferably, the two engaging arms 224, the female connector elastic arm 222, and the female connector body 221 can be formed integrally.

The present disclosure proposes the structure of the male connector terminal 12 and the female connector terminal 22 in such a way that the connector as a whole will be damaged when the male connector 1 is forcibly detached from the female connector 2, so as to restrict the detachment of the male connector 1 from the female connector 2 and prevent reuse of the forcibly detached connector, protect safety of the connector.

The present disclosure proposes the following technical solutions:

C1. A high-stable-small-spacing board-to-board connector terminal comprises a male connector terminal 12 and female connector terminal 22 that are adapted to each other; the female connector terminal 22 includes a female connector body 221 that has a female connector elastic arm portion 222 extending upwards from the upper end of the female connector body 221; the female connector elastic arm portion 222 has an engaging portion 220 suspended on one side for contacting the male connector terminal 12 and restricting the detachment of the male connector terminal 12; the engaging portion 220 has an engagement space 2200 enclosed by two symmetrically arranged engaging arms 224, and the engagement space 2200 includes, from top to bottom, a holding section 220-2, a transition section 220-3, and a restricting section 220-4; the holding section 220-2 is in a "splay" shape, and the restricting section 220-4 is in an inverted "splay" shape; the male connector terminal 12 includes a male connector body including, from top to bottom, a male connector contact section 1221, a male connector slot section 1222, and a male connector head section 1223, and the width of the male connector contact section 1221 is not greater than the width of the holding section 220-2; the width of the male connector slot section 1222 is not greater than the width of the restricting section 220-4; when the male connector terminal 12 is inserted into the engaging portion 220 of the female connector terminal 22, the male connector head section 1223 is located below the restricting section 220-4, the male connector slot section 1222 is located within the restricting section 220-4, and a part or all of the male connector contact section 1221 is located within the holding section 220-2 and the transition section 220-3.

C2. According to C1, the transition section 220-3 includes a first transition subsection 220-3-1 and a second transition subsection 220-3-2; the upper end of the first transition subsection is connected to the lower end of the holding section 220-2, and the angle between the inner wall of the engaging arm 224 of the first transition subsection and the central axis of the engagement space 2200 is an acute angle; the upper end of the second transition subsection is connected to the lower end of the first transition subsection, and the lower end of the second transition subsection is connected to the upper end of the restricting section 220-4; and the inner wall of the engaging arm 224 of the second transition subsection is parallel to the central axis of the engagement space 2200.

C3. According to C2, the female connector elastic arm portion 222 is connected to the outer side of the first transition subsection by means of a connection piece 223;

and the lower end of the holding section 220-2 is flush with the upper end of the female connector elastic arm portion 222.

C4. According to C1, the engagement space 2200 further includes a guiding section 220-1 that is connected to the upper end of the holding section 220-2, and is in an inverted "splay" shape.

C5. According to C1, the male connector head section 1223 is in a warhead shape, and the connection surface between the male connector head section 1223 and the male connector slot section 1222 is a concave arc surface.

C6. According to C5, a clamping section 220-5 further extending from the lower end of the restricting section 220-4, and the inner wall of the engaging arm 224 defining the clamping section 220-5 is parallel to the central axis of the engagement space 2200; and the restricting section 220-4 and the clamping section 220-5 are located within the male connector slot section 1222.

C7. According to C6, the lower end face 2201 of the clamping section 220-5 is an inclined plane, or a convex arc face adapted to the concave arc surface of the connection surface of the male connector head section 1223 and the male connector slot section 1222.

C8. According to any one of C1 to C7, the female connector elastic arm portion 222 includes an elastic arm body and an elastic arm groove 2220 provided on the elastic arm body; the elastic arm groove 2220 divides the elastic arm body into two female connector elastic pieces; and the two engaging arms 224 are provided at one side of the upper portion of the female connector elastic piece, respectively.

C9. A high-stable-small-spacing board-to-board connector comprises a male connector 1 and a female connector 2 that are connected; the male connector 1 includes a male connector plastic body 11, a male connector PCB 10, and a male connector terminal 12, and the female connector 2 includes a female connector plastic body 21, a female connector PCB 20, and a female connector terminal 22; a plurality of male connector slots 110 are provided in the male connector plastic body 11, and the male connector terminal 12 is accommodated in the male connector slot 110; a plurality of female connector slots 210 are provided in the female connector plastic body 21, and the female connector terminal 22 is accommodated in the female connector slot 210; the male connector terminal 12 is the male connector terminal 12 according to any one of claims 1 to 8, and the female connector terminal 22 is the female connector terminal 22 according to any one of claims 1 to 8.

C10. According to C9, male connector metal fixing sheets 41 are provided on the inner wall of both sides of the male connector plastic body 11; the male connector metal fixing sheet 41 includes a male connector fixing body 410; one end of the male connector fixing body 410 has a male connector clasp 411 connected to the male connector plastic body 11, while the other end of the male connector fixing body 410 has a male connector contact piece 412 electrically connected to the male connector PCB 10; a plurality of male connector elastic pieces 413 and male connector slots 414 are spaced on the male connector fixing body 410; the male connector elastic piece 413 extends at one side of the male connector fixing body 410 away from the male connector plastic body 11; and female connector metal fixing sheets 42 are provided on the outer wall of both sides of the female connector plastic body 21; the female connector metal fixing sheet 42 includes a female connector fixing body 420; one end of the female connector fixing body 420 has a female connector clasp 422 connected to the female connector plastic body 21, while the other end of the female connector fixing body 420 has a female connector contact piece 421 electrically connected to the female connector PCB 20; a plurality of female connector elastic pieces adapted to the male connector slots 414 are provided on the female connector fixing body 420, and the female connector elastic piece extends at the outer side of the female connector fixing body 420.

C11. A secure small-spacing board-to-board connector comprises a male connector including a male connector plastic body 11, a male connector PCB 10, and a male connector terminal 12, and a female connector including a female connector plastic body 21, a female connector PCB 20, and a female connector terminal 22 that are connected;

a plurality of male connector slots 110 are provided in the male connector plastic body 11, and the male connector terminal 12 is accommodated in the male connector slot 110; a plurality of female connector slots 210 are provided in the female connector plastic body 21, and the female connector terminal 22 is accommodated in the female connector slot 210; the male connector terminal 12 includes a first male terminal portion 121 electrically connected to the male connector PCB 10, and a second male terminal portion 122 extending beyond the male connector slot 110; the female connector terminal 22 includes a first female terminal portion electrically connected to the female connector PCB 20, and a second female terminal portion inserted in the second male terminal portion; and further includes a first protective structure configured to restrict the detachment of the second male terminal portion from the second female terminal portion.

C12. According to C11, the first protective structure includes a first part 31 provided on the second male terminal portion and a second part 32 provided on the second female terminal portion; the second male terminal portion includes a second male terminal body, and the first part forms on the end of the second male terminal body; the second female terminal portion includes a second female terminal body, and the second part forms on one side of the upper portion of the second female terminal body.

C13. According to C12, the first part includes a warhead-like first protective head, the upper surface of the connecting portion between the first protective head and the second male terminal body is a concave arc surface; the second part includes two restricting elastic pieces opposite each other; the restricting elastic piece includes, from top to bottom, a guiding section, a connection section, and a restricting section; when the male connector is detached from the female connector, the restricting section hooks the first protective head.

C14. According to C13, a female terminal restricting structure configured to restrict the position of the female connector terminal 22 is provided on the inner wall of the female connector slot 210; the female terminal restricting structure includes a female terminal lower restricting portion configured to restrict the female connector terminal 22 to fit on the inner wall of the female connector slot 210, and a female terminal upper restricting portion 2102 configured to restrict the second part within the female connector slot 210.

C15. According to C13, the second female terminal body is provided with an inset groove extending in the height direction; the inset groove divides the second female terminal body into two second female connector elastic pieces, and the two restricting elastic pieces are provided on one side of the upper portion of the second female connector elastic piece, respectively.

C16. According to C12, the second male terminal body comprises a second male terminal extension section and a second male terminal connection section; the first part is connected to one end of the second male terminal connection section, and the second male terminal extension section is connected to the other end of the second male terminal connection section; the width of the second male terminal extension section is greater than the width of the second male terminal connection section, and the second male terminal extension section and the second male terminal connection section have a guiding slope at the connection.

C17. According to any one of C11 to C16, the connector further comprises a second protective structure including male connector metal fixing sheets 41 provided on the inner wall of both sides of the male connector plastic body 11 and female connector metal fixing sheets 42 provided on the outer wall of both sides of the female connector plastic body 21; when the male connector is connected to the female connector, the female connector plastic body 21 is embedded in the male connector plastic body 11, the male connector metal fixing sheet 41 is embedded in the female connector fixing metal sheet, and the male connector metal fixing sheet 41 and the female connector metal fixing sheet 42 prevent the detachment of the male connector from the female connector.

C18. According to C17, the male connector metal fixing sheet 41 includes a male connector fixing body 410; one end of the male connector fixing body 410 has a male connector clasp 411 connected to the male connector plastic body 11, and the other end of the male connector fixing body 410 has a male connector contact piece 412 electrically connected to the male connector PCB 10; a plurality of male connector elastic pieces 413 and male connector slots 414 are spaced on the male connector fixing body 410; the male connector elastic piece 413 extends on one side of the male connector plastic body 11 away from the male connector fixing body 410; and the female connector metal fixing sheet 42 includes a female connector fixing body 420; one end of the female connector fixing body 420 is provided with a female connector clasp 422 connected to the female connector plastic body 21, and the other end of the female connector fixing body 420 is provided with a female connector contact piece 421 electrically connected to the female connector PCB 20; the female connector fixing body is provided with a plurality of female connector elastic pieces adapted to the male connector slot 414, and the female connector elastic piece extends on the outer side of the female connector fixing body 420.

C19. According to C18, the male connector PCB 10 is provided on one side of the male connector plastic body 11; the male connector metal fixing sheet 41 away from the male connector PCB 10 is electrically connected to the male connector PCB 10 by means of a male connector metal housing; the male connector metal housing is L-shaped, and includes a first housing body and a second housing body that are connected; one end of the first housing body has a housing contact piece that is in contact with the male connector contact piece 412, and one end of the second housing body has a housing welding piece electrically connected to the male connector PCB 10; the second housing body is provided with a plurality of housing clasp pieces protruding from one side facing the male connector plastic body 11, and the housing clasp piece is adapted to the plastic body slot on the outer wall of the male connector plastic body 11; and the male connector metal fixing sheet 41 near the male connector PCB 10 is electrically connected to the male connector PCB 10 by means of a male connector welding metal strip having a metal strip welding piece electrically connected to the male connector PCB 10 and a metal strip contact piece in contact with the male connector contact piece 412.

C20. According to C19, the male connector plastic body 11 comprises a left surface and a right surface opposite each other, two end surfaces opposite each other, and a bottom surface opposite to the opening portion; male connector slots 110 are provided on the bottom surface and extend along the thickness direction of the bottom surface; the male connector PCB 10 is provided outside the right surface, on which the first mounting slot 115 is provided in parallel to the male connector slot 110, the bottom surface is provided with a second mounting slot 116 extending along the width direction of the bottom surface, and the first mounting slot 115 communicates with the second mounting slot 116 and communicates with the male connector slot 110; and the two end surfaces are provided with metal sheets at the male connector side configured to secure the male connector plastic body 11 on the male connector PCB 10.

Although the present disclosure is described in detail with reference to the embodiments as described above, it will be apparent to a person skilled in the art that the present disclosure is not limited to the embodiments described in the present specification. The present disclosure can be modified and implemented as modified embodiments without departing from the spirit and the scope of the present disclosure defined by the claims. The disclosure of the present specification is therefore intended to be illustrative, but does not have any limitative effect on the present disclosure.

What is claimed is:

1. A board-to-board connector terminal comprising:

a male connector terminal including a first part; and a female connector terminal including a second part, wherein the male connector terminal is in contact with the female connector terminal in a state where the male connector terminal and the female connector terminal are adaptively installed, wherein when the male connector terminal is in the process of being detached from the female connector terminal, the second part abuts against the first part, so as to prevent the male connector terminal from being completely detached from the female connector terminal, and in the case of the male connector terminal forcibly detached from the female connector terminal, the first part pushes the second part to cause the second part to be peeled off, such that the female connector terminal is damaged and does not work properly, wherein the first part includes a male connector slot section and a male connector head section, the male connector head section is located at a front end of the male connector terminal, the male connector slot section is located at a rear portion of the male connector head section, a width of the male connector head section is greater than a width of the male connector slot section, and a connecting portion between the male connector slot section and the male connector head section forms a stepped portion; and the second part includes an engaging portion that encloses an engagement space including a restricting section, in the direction of inserting the male connector terminal into the engaging portion, side surfaces of two engaging arms that define the restricting section are tapered in an inverted "splay" shape, in the case of the male connector terminal and the female connector terminal adaptively installed, the male connector head section is located outside of the engagement space, and the width of the male connector head section is greater than a width of the restricting section when the engaging arm is in a natural state, and when the male connector terminal is detached from the female connector terminal, the stepped portion is capable of pushing the engaging arms, causing the engaging arms to be peeled off, and the female connector terminal to be damaged.

2. The board-to-board connector terminal according to claim 1, wherein the engagement space further includes a guiding section, in the direction of inserting the male connector terminal into the engaging portion, the guiding section is located at an upstream of the restricting section, and the side surfaces of the two engaging arms that define the guiding section are tapered in an inverted "splay" shape, such that the engaging arms are capable of guiding the male connector terminal into the engagement space.

3. The board-to-board connector terminal according to claim 2, wherein the engagement space further includes a holding section, in the direction of inserting the male connector terminal into the engaging portion, the holding section is located at the upstream of the restricting section, and is located at the downstream of the guiding section, in the direction of inserting the male connector terminal into the engaging portion, the side surfaces of the two engaging arms that define the holding section are diverged in a "splay" shape, and are convex arc surfaces, and in the case of the male connector terminal and the female connector terminal adaptively installed, the two engaging arms that define the holding section hold the male connector terminal, such that the male connector terminal and the engaging arms are in arc surface contact.

4. The board-to-board connector terminal according to claim 2, wherein the engagement space further includes a clamping section, in the direction of inserting the male connector terminal into the engaging portion, the clamping section is located at the downstream of the restricting section, and in the case of the male connector terminal and the female connector terminal adaptively installed, the two engaging arms that define the clamping section clamp the male connector slot section.

5. The board-to-board connector terminal according to claim 1, wherein the male connector terminal further includes a male connector contact section having a width greater than the width of the restricting section when the engaging arms are in the natural state, and in the case of the male connector terminal and the female connector terminal adaptively installed, the parts of the two engaging arms that define the restricting section are pushed apart and clamp the male connector contact section.

6. The board-to-board connector terminal according to claim 5, wherein a connecting portion between the male connector contact section and the male connector slot section forms a guiding slope, and when the male connector terminal is inserted into the engaging portion, the guiding slope is capable of fitting the side surfaces of the two engaging arms that define the restricting section, so that the two engaging arms are pushed apart.

7. The board-to-board connector terminal according to claim 1, wherein the stepped portion is formed into a concave arc surface, and the concave arc surface abuts against the engaging arms when the male connector terminal is detached from the female connector terminal.

8. A board-to-board connector comprising:

a male connector including a male connector terminal including a first part; and a female connector including a female connector terminal including a second part, wherein the male connector terminal is in contact with the female connector terminal in a state where the male connector terminal and the female connector terminal are adaptively installed, wherein when the male connector terminal is in the process of being detached from the female connector terminal, the second part abuts against the first part, so as to prevent the male connector terminal from being completely detached from the female connector terminal, and in the case of the male connector terminal forcibly detached from the female connector terminal, the first part pushes the second part to cause the second part to be peeled off, such that the female connector terminal is damaged and does not work properly, wherein the male connector further includes a male connector metal fixing sheet having a male connector slot, the female connector further includes a female connector metal fixing sheet comprising a female connector fixing body and a female connector elastic piece that is resiliently connected to the female connector fixing body, in the case of the male connector terminal and the female connector terminal adaptively installed, the female connector elastic piece is embedded into the male connector slot, and when the male connector is detached from the female connector, the female connector elastic piece abuts against an edge of the male connector slot.

9. The board-to-board connector according to claim 8, wherein the male connector metal fixing sheet has a male connector elastic piece, and in the case of the male connector and the female connector adaptively installed, the female connector applies pressure to the male connector elastic piece to deform the male connector elastic piece, such that the male connector and the female connector press each other to increase connection stability.

* * * * *